US010411591B2

(12) United States Patent
Fu et al.

(10) Patent No.: US 10,411,591 B2
(45) Date of Patent: *Sep. 10, 2019

(54) HOLDUP TIME CIRCUIT AND METHOD FOR BRIDGELESS PFC CONVERTER

(71) Applicant: Futurewei Technologies, Inc., Plano, TX (US)

(72) Inventors: Dianbo Fu, Frisco, TX (US); Hengchun Mao, Plano, TX (US); Bing Cai, Richardson, TX (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/451,254

(22) Filed: Mar. 6, 2017

(65) Prior Publication Data

US 2017/0179813 A1     Jun. 22, 2017

Related U.S. Application Data

(63) Continuation of application No. 13/219,513, filed on Aug. 26, 2011, now Pat. No. 9,590,495.

(51) Int. Cl.
*H02M 1/42* (2007.01)
*H02M 5/20* (2006.01)
*H02M 5/293* (2006.01)
*H02M 1/32* (2007.01)

(52) U.S. Cl.
CPC ....... *H02M 1/4208* (2013.01); *H02M 1/4225* (2013.01); *H02M 5/20* (2013.01); *H02M 5/293* (2013.01); *H02M 1/32* (2013.01); *Y02B 70/126* (2013.01); *Y02P 80/112* (2015.11)

(58) Field of Classification Search
CPC ....... H02M 1/4208; H02M 5/293; H02M 5/20
See application file for complete search history.

(56) References Cited

U.S. PATENT DOCUMENTS

| 4,412,277 A | 10/1983 | Mitchell |
| 5,793,626 A | 8/1998 | Jiang |
| 6,255,744 B1 | 7/2001 | Shih et al. |
| 7,269,038 B2 | 9/2007 | Shekhawat et al. |
| 7,605,570 B2 | 10/2009 | Liu et al. |

(Continued)

FOREIGN PATENT DOCUMENTS

| CN | 1864319 A | 11/2006 |
| CN | 101645660 A | 2/2010 |

(Continued)

*Primary Examiner* — Adolf D Berhane
*Assistant Examiner* — Afework S Demisse
(74) *Attorney, Agent, or Firm* — Slater Matsil, LLP

(57) ABSTRACT

An embodiment holdup time circuit of a bridgeless power factor correction circuit comprises a charge device connected between an output terminal of a bridgeless power factor correction circuit and an energy storage apparatus, a discharge device connected between the energy storage apparatus and an input of the bridgeless power factor correction circuit, the energy storage apparatus and the bridgeless power factor correction circuit comprising a first boost converter, a second boost converter, a first switch and a second switch, wherein the first switch is connected between the first boost converter and ground and the second switch is connected between the second boost converter and ground.

20 Claims, 20 Drawing Sheets

(56) References Cited

U.S. PATENT DOCUMENTS

| | | |
|---|---|---|
| 8,270,129 B2 | 9/2012 | Gjerde et al. |
| 8,467,212 B2 | 6/2013 | Mino et al. |
| 8,817,506 B2 | 8/2014 | Shimomugi et al. |
| 2002/0101096 A1 | 8/2002 | Nagasawa |
| 2006/0198172 A1 | 9/2006 | Wood |
| 2009/0027931 A1 | 1/2009 | Usui |
| 2010/0014330 A1 | 1/2010 | Chang et al. |
| 2010/0277837 A1* | 11/2010 | Myhre ................ H02M 1/4225 361/18 |
| 2011/0037444 A1 | 2/2011 | Wildash |
| 2011/0134671 A1* | 6/2011 | Balocco ................ H02M 1/32 363/126 |
| 2012/0008354 A1 | 1/2012 | Tang |

FOREIGN PATENT DOCUMENTS

| | | |
|---|---|---|
| CN | 101919149 A | 12/2010 |
| WO | 2010076734 A1 | 7/2010 |

* cited by examiner

HOLDUP TIME CIRCUIT AND METHOD FOR BRIDGELESS PFC CONVERTER

PRIORITY CLAIM AND CROSS-REFERENCE

This application is a continuation of U.S. patent application Ser. No. 13/219,513, filed on Aug. 26, 2011, entitled "Holdup Time Circuit and Method for Bridgeless PFC Converter", which application is hereby incorporated herein by reference in its entirety.

TECHNICAL FIELD

The present invention relates generally to bridgeless power factor correction converters and methods, and, more particularly, to a holdup time circuit and method for bridgeless power factor correction converters.

BACKGROUND

A telecommunication network power system usually includes an ac-dc stage converting the power from the ac utility line to a 48V dc distribution bus. A conventional ac-dc stage may comprise a variety of EMI filters, a bridge rectifier formed by four diodes, a power factor correction circuit and an isolated dc/dc power converter. The bridge rectifier converts an ac voltage into a full-wave rectified dc voltage. Such a full-wave rectified dc voltage provides a dc input voltage for the power factor correction circuit. The power factor correction circuit may be implemented by employing a power converter including a boost converter. By employing an appropriate control circuit, the boost converter is capable of shaping the input line current to be sinusoidal and in phase with the sinusoidal input voltage of the ac input source. As a result, the power factor of the ac-dc stage may be close to unity as required by a variety of international standards (e.g., EU standard EN55022).

A boost converter may comprise an inductor coupled between the input voltage and a joint point of a switch and a diode. In the power management industry, the joint point of the switch and the diode is commonly referred to as the switching node of a power converter. In the boost converter, the switch is coupled between the switching node and ground. The diode is placed between the switching node and the output of the boost converter. As indicated by its name, a boost converter's output voltage is greater than its input voltage. When the switch is turned on, the inductor is charged from the input voltage through the turned on switch. At the same time, the diode is reverse-biased so that the output of the boost converter is isolated from the input of the boost converter. On the other hand, when the switch is turned off, the diode is forward-biased. As a result, the output of the boost converter receives energy from the charged inductor as well as the input voltage.

A telecommunication network power system may require a plurality of bulk capacitors to store energy. The plurality of bulk capacitors help to sustain the 48V distribution bus voltage for approximately 20 ms by discharging the energy stored in the bulk capacitors into the 48V distribution bus after a dropout of the input ac source. In a typical power system, the holdup time energy is stored in the bulk capacitors connected between the output of the ac/dc power stage and ground. During a dropout of the input ac source, the voltage across the bulk capacitors is discharged to sustain the operation of downstream power converters. In order to improve the telecommunication network power system's efficiency, high efficiency downstream power converters having a narrow input voltage range are employed to convert the output of the ac/dc power stage (approximately 400V) into the 48V distribution bus. Such a narrow input voltage causes the downstream power converters to use only a limited amount of energy stored in the bulk capacitors.

SUMMARY OF THE INVENTION

These and other problems are generally solved or circumvented, and technical advantages are generally achieved, by preferred embodiments of the present invention which provide an apparatus and method for achieving a high efficiency bridgeless power factor correction circuit.

In accordance with an embodiment, a circuit comprises a charge device connected between an output terminal of a bridgeless power factor correction circuit and an energy storage apparatus, a discharge device connected between the energy storage apparatus and an input of the bridgeless power factor correction circuit, the energy storage apparatus and the bridgeless power factor correction circuit comprising a first boost converter, a second boost converter, a first switch and a second switch, wherein the first switch is connected between the first boost converter and ground and the second switch is connected between the second boost converter and ground.

In accordance with another embodiment, a system comprises a bridgeless power factor correction circuit comprising a first boost converter coupled between an input ac source and an output, a second boost converter coupled between the input ac source and the output, a first switch coupled between an input of the first boost converter and ground and a second switch coupled between an input of the second boost converter and ground, a charge device connected between an output terminal of a bridgeless power factor correction circuit and an energy storage apparatus and a discharge device connected between the energy storage apparatus and an input of the bridgeless power factor correction circuit.

In accordance with yet another embodiment, a method comprises charging an energy storage apparatus through a charge device, wherein the charge device is coupled between an output of a bridgeless power factor correction circuit and the energy storage apparatus, detecting a dropout of an input ac source coupled to an input of the bridgeless power factor correction circuit and discharging the energy storage apparatus through a discharge device, wherein the discharge device is connected between the energy storage apparatus and the input of the bridgeless power factor correction circuit.

An advantage of an embodiment of the present invention is reducing the number of bulk capacitors by fully utilizing the energy storage apparatus coupled to an input of a bridgeless power factor correction circuit. The reduction of bulk capacitors can improve the reliability and cost of a power system having the bridgeless factor correction circuit.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a holdup time circuit for a bridgeless power factor correction circuit. The invention may also be applied, however, to a variety of power factor correction circuits operating in different modes (e.g., discontinuous conduction mode, critical conduction mode or continuous conduction mode), employing different modulation mechanisms (e.g., leading edge pulse width modulation, trailing edge pulse width modulation or pulse frequency modulation) and adopting different control schemes (e.g., peak current mode control or average current mode control).

Figure 1:
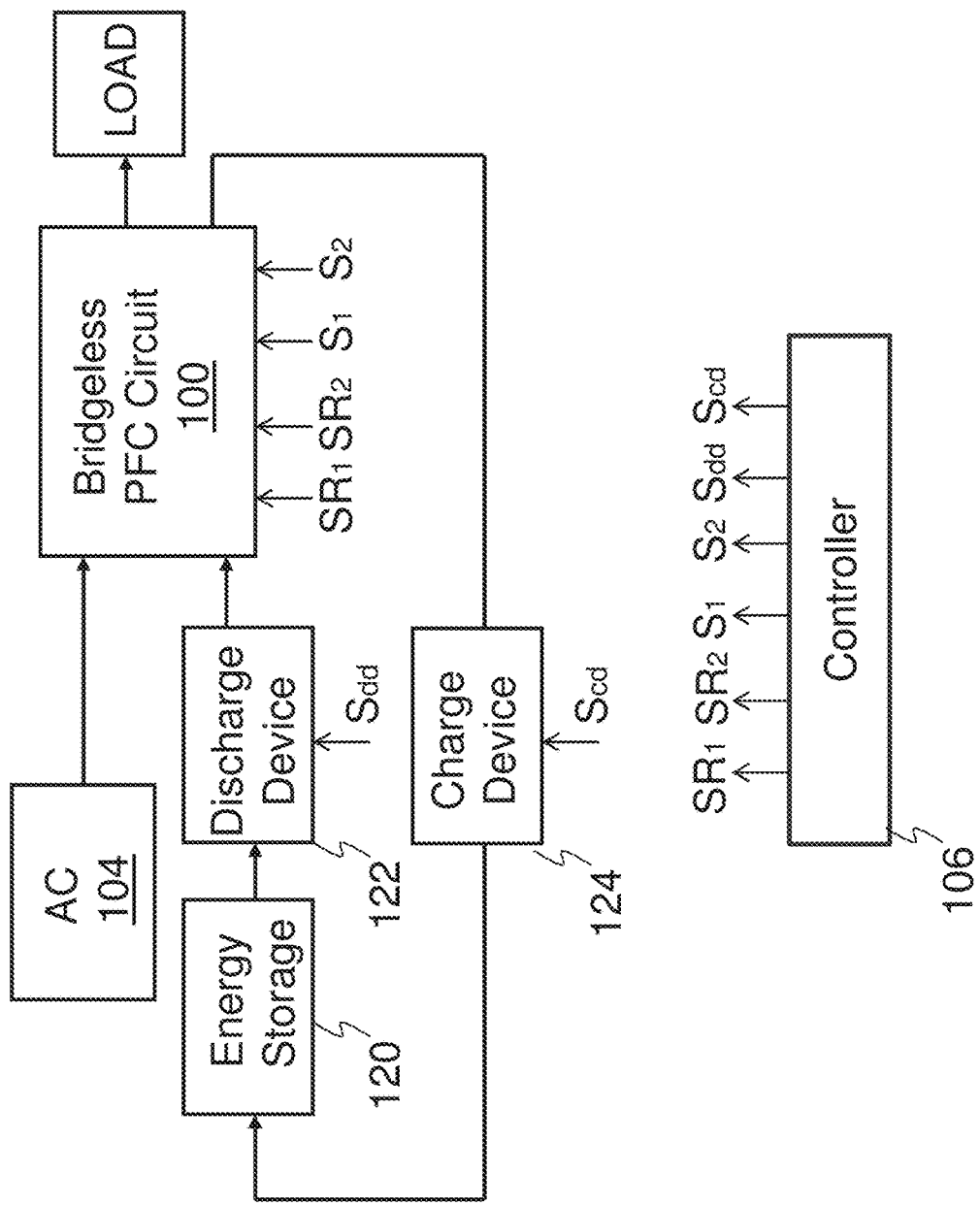
FIG. 1 illustrates a block diagram of a bridgeless power factor correction circuit having an energy storage apparatus in accordance with an embodiment.

Referring initially to FIG. 1, a block diagram of a bridgeless power factor correction circuit having an energy storage apparatus is illustrated in accordance with an embodiment. A bridgeless power factor correction circuit 100 is coupled between an input ac source 104 and a load. The output of the bridgeless power factor correction circuit 100 is coupled to an energy storage apparatus 120 through a charge device 124. In addition, the energy storage apparatus 120 is coupled to an input of the bridgeless power factor correction circuit 100 through a discharge device 122. As shown in FIG. 1, the energy storage apparatus 120, the discharge device 122 and the charge device 124 form a holdup time circuit through which the output of the bridgeless power factor correction circuit 100 may maintain the same for a predetermined period after the input ac source has a dropout.

Moreover, a controller 106 is employed to provide a plurality of control signals for the bridgeless power factor correction circuit 100, the charge device 124 and the charge device 122. More particularly, four signals, namely SR1, SR2, S1 and S2 are sent from the controller 106 to the bridgeless power factor correction circuit 100 to control the operation of switches SR1, SR2, S1 and S2 (not shown but illustrated in FIG. 2). Similarly, two signals Sdd and Scd are sent to the discharge device 122 and the charge device 124 respectively. The detailed operation principles of the first four signals will be described below with respect to FIGS. 2-8. The detailed operation principles of Sdd and Scd will be described below with respect to FIGS. 9-15. It should be noted that while FIG. 1 shows a single controller is employed to generate the signals for the bridgeless power factor correction circuit 100, the discharge device 122 and the charge device 124, a person skilled in the art will recognize that there may be a variety of alternatives for implementing the function of the controller 106. For example, the controller 106 can be replaced by two separate controllers dedicated to the bridgeless power factor correction circuit 100 and the holdup time circuit respectively.

Figure 2:
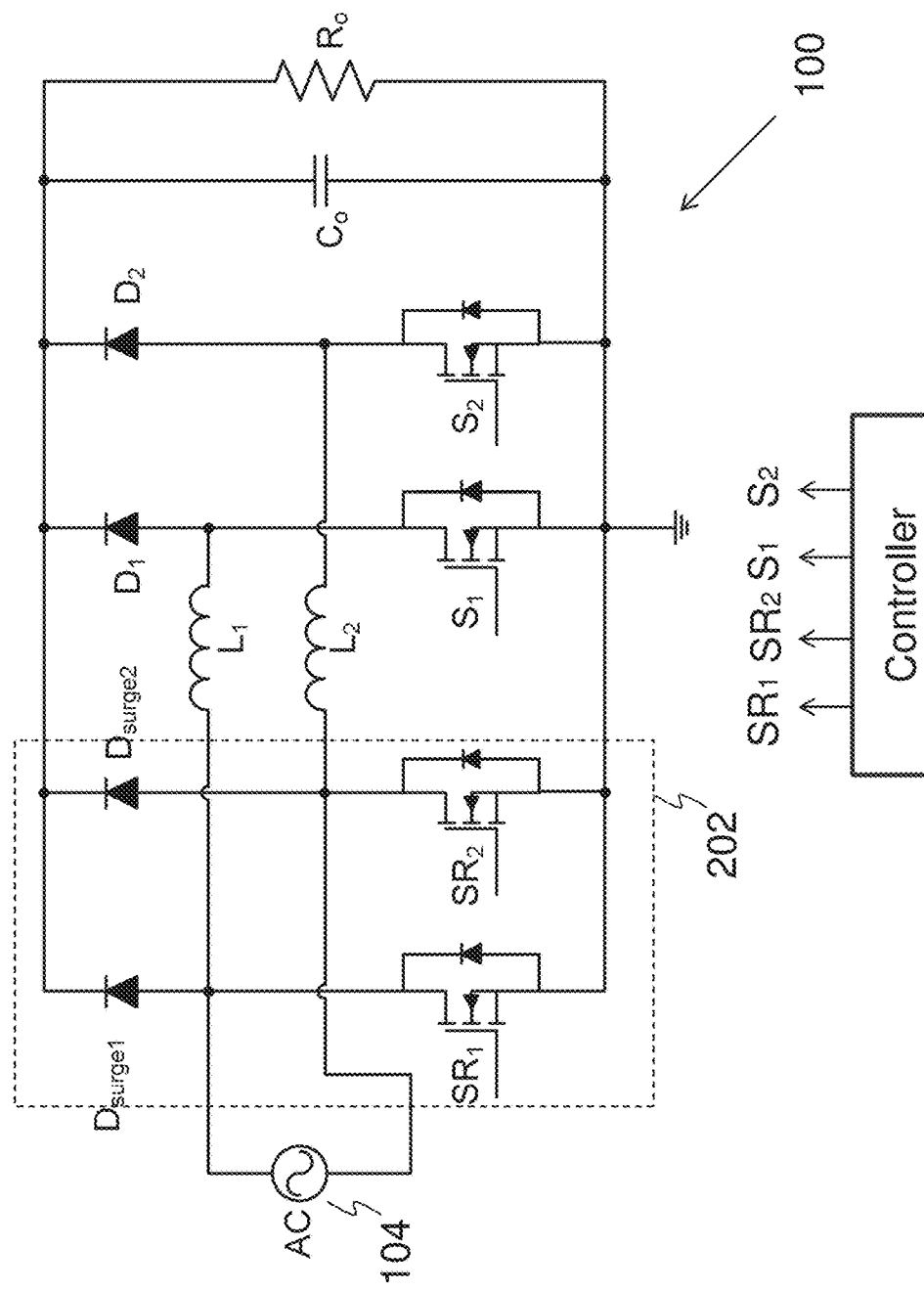
FIG. 2 illustrates a schematic diagram of the bridgeless power factor correction circuit in accordance with an embodiment.

FIG. 2 illustrates a schematic diagram of the bridgeless power factor correction circuit 100 in accordance with an embodiment. The bridgeless power factor correction circuit 100 has an input coupled to an ac power source, an output coupled to an output capacitor Co, which is connected in parallel to a load represented by a resistor Ro. As shown in FIG. 1, the bridgeless power factor correction circuit 100 comprises two boost converters configured to work in tandem. More particularly, a first inductor L1, a first switch S1 and a first diode D1 form the first boost converter providing power factor correction during the first half cycle of the input ac source. Similarly, a second inductor L2, a second switch S2 and a second diode D2 form the second boost converter, which is activated by a controller 106 to provide power factor correction during the second half cycle of the input ac source.

As shown in FIG. 2, both the first inductor L and the second inductor L2 have a terminal coupled to the inputs of the input ac source respectively. As a result, the output of the power factor correction circuit 100 may be floating regarding the input ac source if switches SR1 and SR2 are not included in the power factor correction circuit 100. Such a floating output regarding the input ac source makes the power factor correction circuit 100 susceptible to common mode noise. In order to prevent the output of the power factor correction circuit 100 from floating, the switches SR1 and SR2 are added so that the output of the bridgeless power factor correction 100 is coupled to the input line through the switches SR1 or SR2 all the time. The detailed operation of the switches SR1 and SR2 will be described below in respect to FIGS. 3-6. Furthermore, two surge protection diodes Dsurge1 and Dsurge2 are employed to protect the bridgeless power factor correction circuit 100 from either surges occurred in the first half cycle of the input ac source or surges occurred in the second half cycle of the input ac source.

Figure 3:
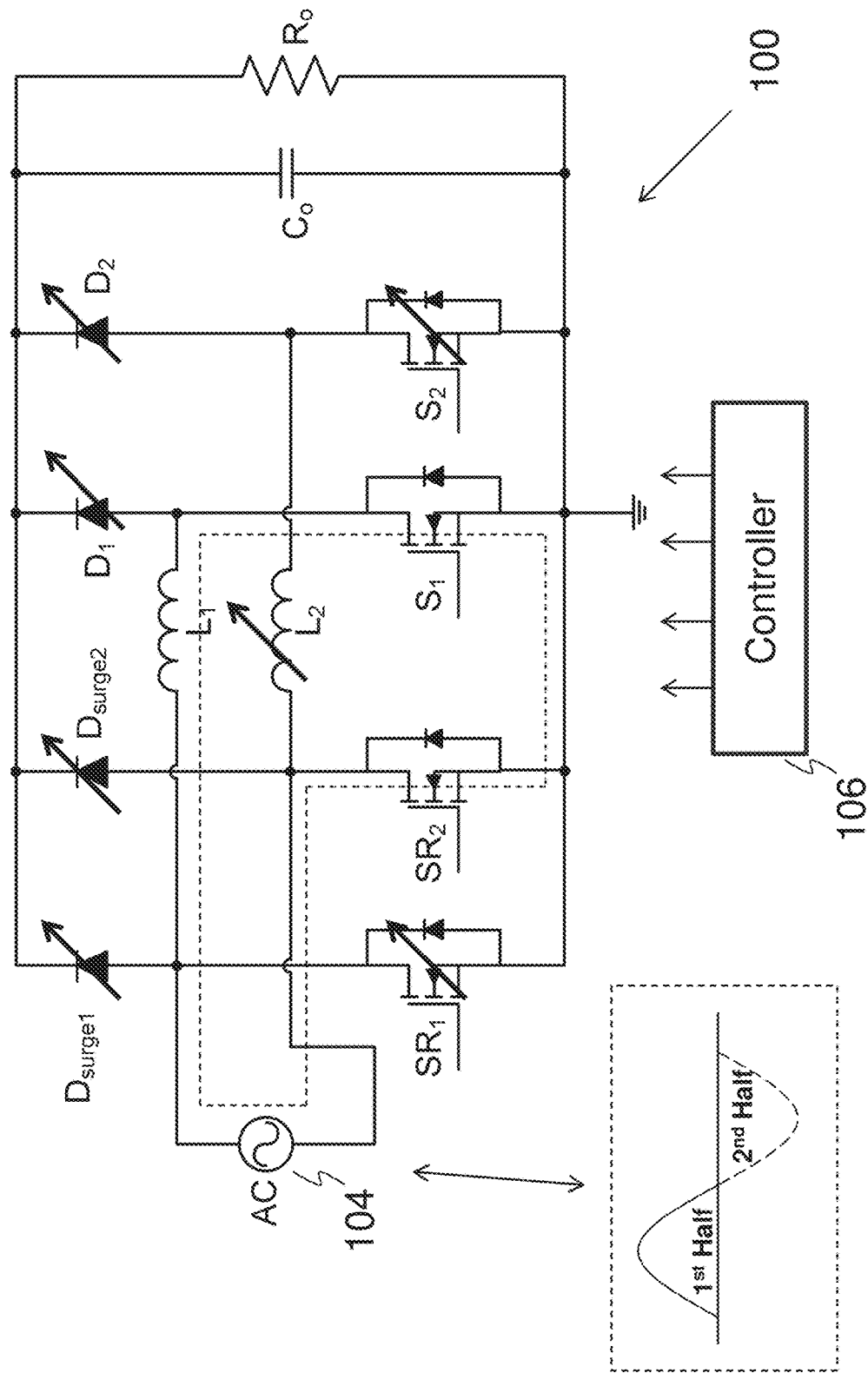
FIG. 3 illustrates a schematic diagram of a bridgeless power factor correction circuit operating in a switch conduction mode in the first half cycle of the input ac source in accordance with an embodiment.

FIG. 3 illustrates a schematic diagram of a bridgeless power factor correction circuit operating in a switch conduction mode in the first half cycle of the input ac source in accordance with an embodiment. When the first half cycle of the input ac source is applied to the bridgeless power factor correction circuit 100, in response to the first half cycle, the controller 106 turns off the second switch S2 and the switch SR1. Simultaneously, the switch SR2 is turned on. The on/off status of the first switch S and the first diode D1 is determined by the operation principles of boost converters.

During the on period of the first switch S1, the first diode D1 is reverse-biased. As a result, the input ac source charges the first inductor L1 through a conductive path formed by the first inductor L1, the first switch S1 and the switch SR2. In FIG. 3, the dashed line indicates the conductive path during the switch-on period of the first half cycle of the input ac source. It should be noted that the black arrows placed on top of the components of FIG. 3 indicate such components are disabled during this phase of the operation of the bridgeless power factor correction circuit 100. It should further be noted that while FIG. 3 shows the charge current flows through the switch SR2, alternatively, a person skilled in the art will recognize that the charge current may flow through the body diode of the switch SR2. An advantageous feature of having a turned on switch SR2 is that the turned on switch SR2 may provide a smaller voltage drop in comparison with the large drop of a body diode. As a result, the turned on switch SR2 helps to improve the efficiency of the bridgeless power factor correction circuit 100.

Another advantageous feature of having the turned on switch SR2 is the common mode noise of the bridgeless power factor correction circuit 100 is reduced by connected the output's ground to the input ac source directly. In a conventional bridgeless power factor correction circuit, the charge current flows through a conductive path formed by the body diode of the second switch S2 and the second inductor L2. The ground connection of the conventional technique is not connected to the input ac source directly. In contrast, as shown in FIG. 3, during the on period of the first switch S1, the output of the bridgeless power factor correction circuit 100 has a ground connection coupled to the input ac source through the turned on switch SR2. Therefore, the output of the bridgeless power factor correction circuit 100 is not floating. An advantageous feature of employing the switch SR2 is that the common mode noise issue in a conventional bridgeless power factor correction circuit is avoided because the second inductor L2 no longer prevents the output of the bridgeless power factor correction circuit 100 from being connected to the input ac source directly.

Figure 4:
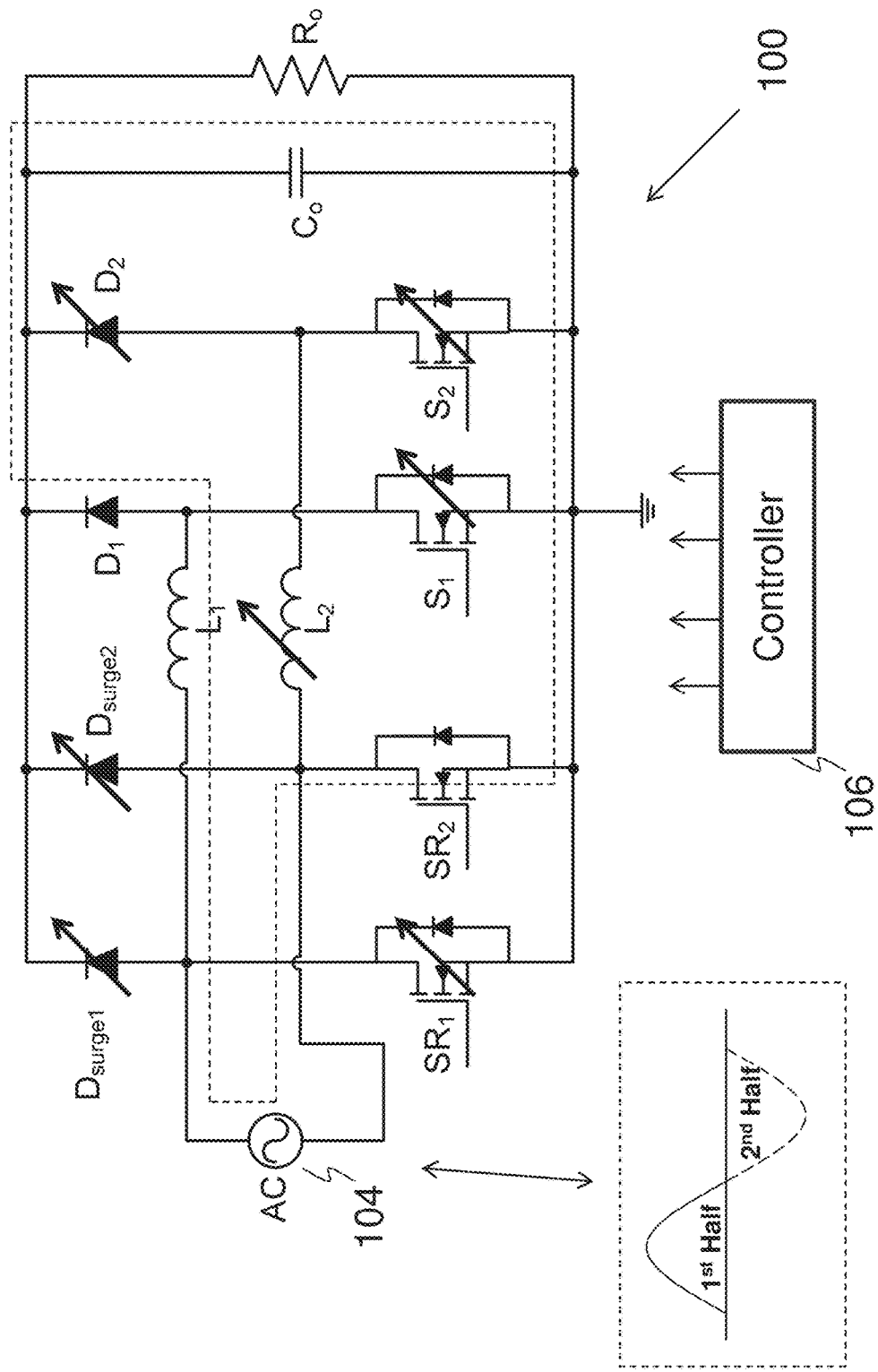
FIG. 4 illustrates a schematic diagram of a bridgeless power factor correction circuit operating in a diode conduction mode in the first half cycle of the input ac source in accordance with an embodiment.

FIG. 4 illustrates a schematic diagram of a bridgeless power factor correction circuit operating in a diode conduction mode in the first half cycle of the input ac source in accordance with an embodiment. Similar to that of FIG. 3, when the first half cycle of the input ac source is applied to the bridgeless power factor correction circuit 100, in response to the first half cycle, the controller 106 turns off the second switch S2 and the switch SR1, and turns on the switch SR2. The on/off status of the first switch S1 and the first diode D1 is determined by the operation principles of a boost converter. When the first switch S1 is turned off, the first diode D1 is forward-biased. As a result, the input ac source as well as the charged inductor delivers energy through a conductive path formed by the first inductor L1, the first diode D1 and the switch SR2. In FIG. 4, the dashed line indicates the conductive path during the diode conduction mode of the bridgeless power factor correction circuit 100 in the first half cycle of the input ac source.

As shown in FIG. 4, during the forward conduction of the first diode D1, the output of the bridgeless power factor correction circuit 100 has a connection coupled to the input ac source through the turned on switch SR2. Therefore, the output of the bridgeless power factor correction circuit 100 is not floating. Similarly, an advantageous feature of employing the switch SR2 is that during the first conduction period, the common mode noise issue in a conventional bridgeless power factor correction circuit is avoided because the second inductor L2 no longer prevents the output of the bridgeless power factor correction circuit 100 from being connected to the input ac source.

Figure 5:
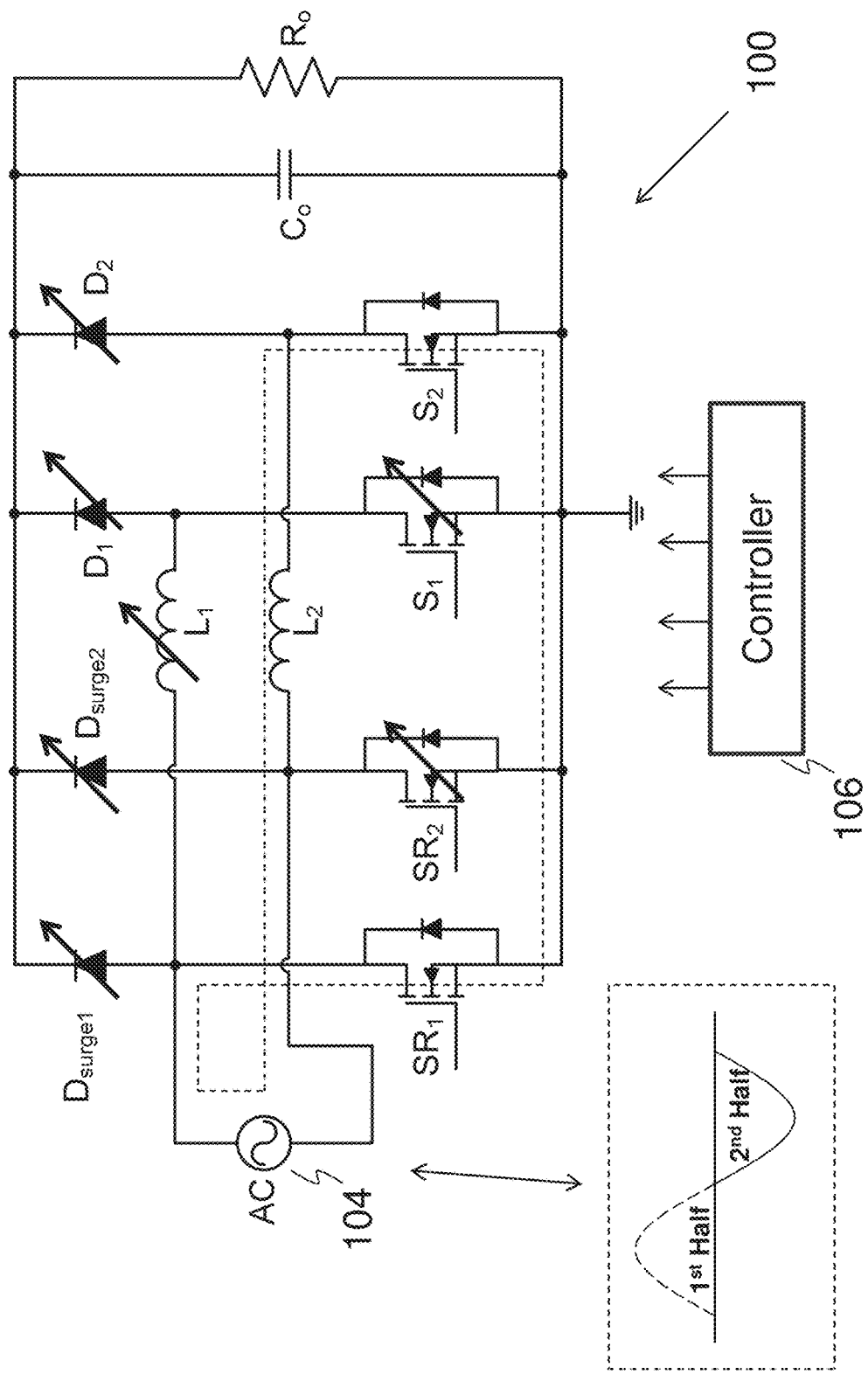
FIG. 5 illustrates a schematic diagram of a bridgeless power factor correction circuit operating in a switch conduction mode in the second half cycle of the input ac source in accordance with an embodiment.

FIG. 5 illustrates a schematic diagram of a bridgeless power factor correction circuit operating in a switch conduction mode in the second half cycle of the input ac source in accordance with an embodiment. When the second half cycle of the input ac source is applied to the bridgeless power factor correction circuit 100, in response to the polarity change of the input ac source, the controller 106 turns off the second switch S1 and the switch SR2, and turns on the switch SR1. The second inductor L2, the second switch S2 and the second diode D2 form a boost converter.

The on/off status of the second switch S2 and the second diode D2 is determined by the operation principles of boost converters. FIG. 5 shows the second switch conduction period in which the second diode D2 is reverse-biased. During the second switch conduction period, the input ac source charges the second inductor L2 through a conductive path formed by the second inductor L2, the second switch S2 and the switch SR1. In FIG. 5, the dashed line indicates the conductive path during the switch on period of the second half cycle of the input ac source.

As shown in FIG. 5, during the on period of the second switch S2, the output of the bridgeless power factor correction circuit 100 has a connection coupled to the input ac source through the turned on switch SR1. The output of the bridgeless power factor correction circuit 100 is not floating because the turned on switch SR1 bypasses a conventional conductive path formed by the body diode of the first switch S1 and the first inductor L1. Similar to the first half cycle of the input ac source, an advantageous feature of employing the switch SR1 in the second half cycle is that the common mode noise issue in a conventional bridgeless power factor correction circuit is avoided because the first inductor L1 no longer prevents the output of the bridgeless power factor correction circuit 100 from being connected to the input ac source directly.

Figure 6:
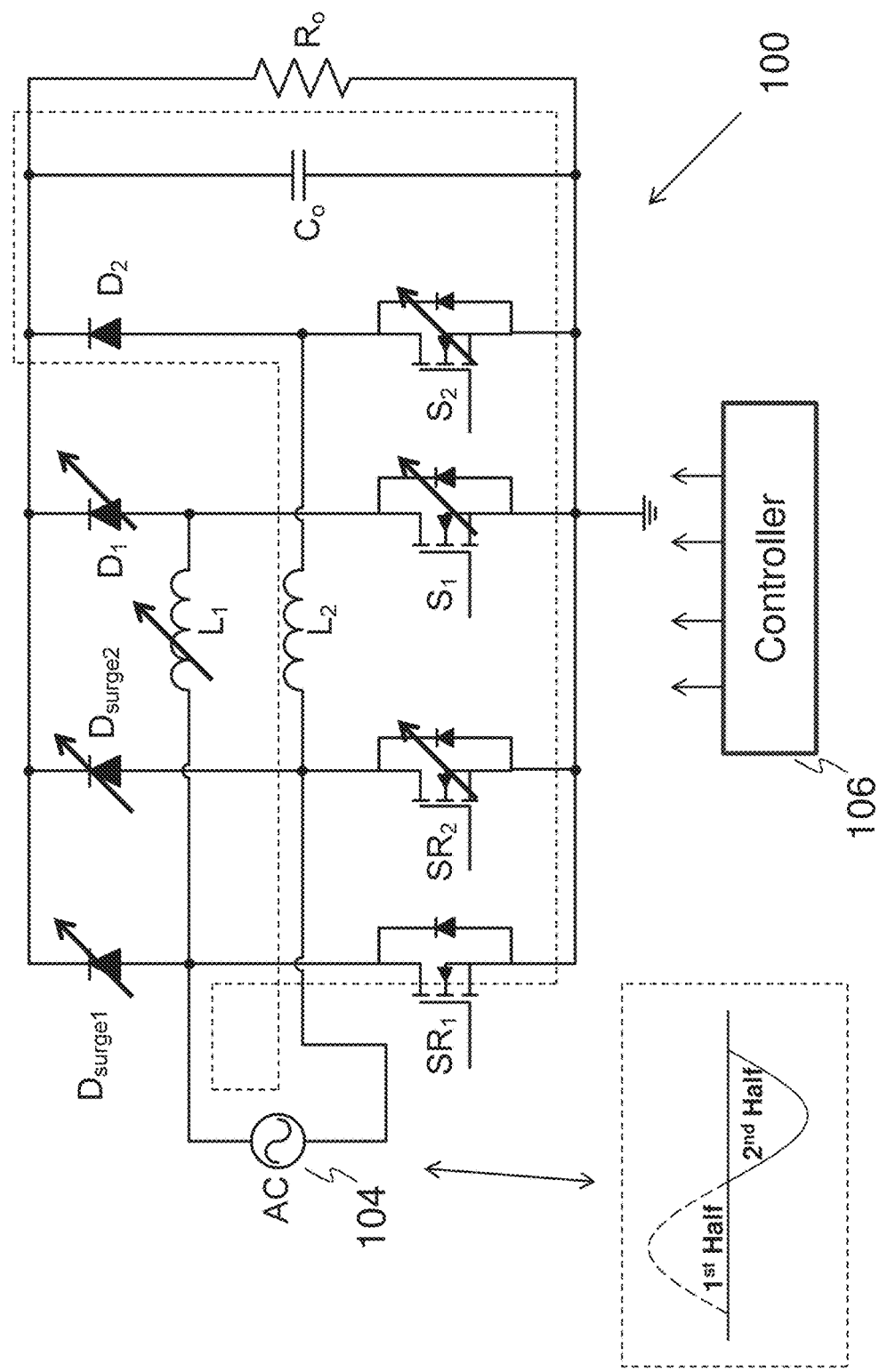
FIG. 6 illustrates a schematic diagram of a bridgeless power factor correction circuit operating in a diode conduction mode in the second half cycle of the input line in accordance with an embodiment.

FIG. 6 illustrates a schematic diagram of a bridgeless power factor correction circuit operating in a diode conduction mode in the second half cycle of the input line in accordance with an embodiment. Similar to that of FIG. 5, when the second half cycle of the input ac source is applied to the bridgeless power factor correction circuit 100, in response to the second half cycle, the controller 106 turns off the first switch S1 and the switch SR2. According to the operation principles of boost converters, at the beginning of a period of a boost converter, the second switch S2 are first turned on.

The controller 106 determines the duty cycle of the second switch S2 based upon the feedback information such as the output voltage and sensed current flowing through the second inductor L2. After the second switch S2 is turned off in accordance with the instructions from the controller 106, the second diode D2 is forward-biased. As a result, the input ac source as well as the charged inductor delivers energy through a conductive path formed by the second inductor L2, the second diode D2 and the switch SR1. In FIG. 6, the dashed line indicates the conductive path during the diode conduction period of the second half cycle of the input ac source.

As shown in FIG. 6, during the forward conduction of the second diode D2, the output of the bridgeless power factor correction circuit 100 has a connection coupled to the input ac source through the turned on switch SR1. Therefore, the output of the bridgeless power factor correction circuit 100 is not floating. Similarly, an advantageous feature of employing the switch SR1 is that during the second diode conduction period, the common mode noise issue in a conventional bridgeless power factor correction circuit is avoided because the first inductor L1 no longer prevents the output of the bridgeless power factor correction circuit 100 from being connected to the input ac source directly.

Figure 7:
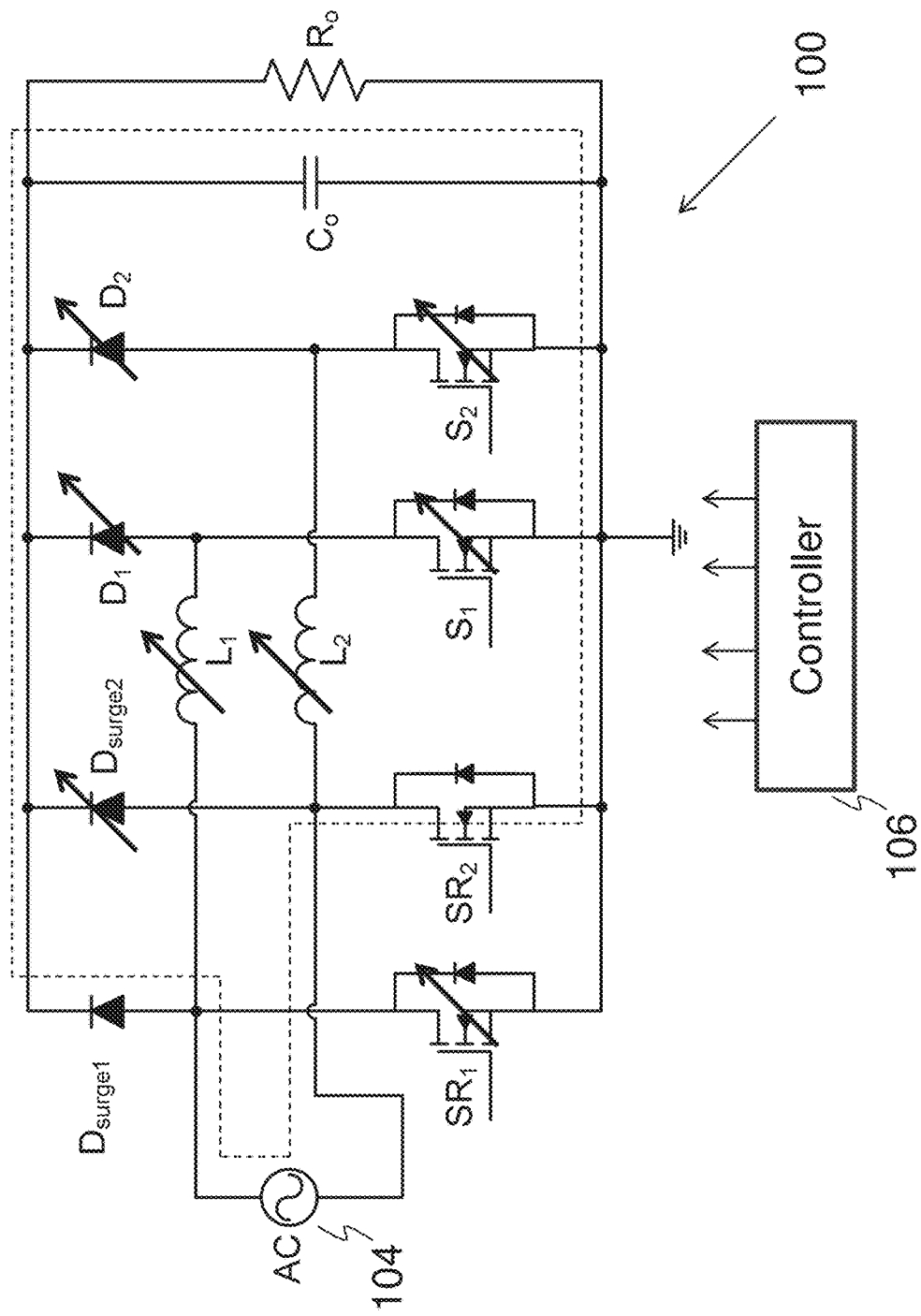
FIG. 7 illustrates a schematic diagram of a bridgeless power factor correction circuit operating in a first half cycle power surge mode in accordance with an embodiment.

FIG. 7 illustrates a schematic diagram of a bridgeless power factor correction circuit operating in a first half cycle power surge mode in accordance with an embodiment. When a surge occurs during the first half cycle of the input ac source, the input voltage amplitude may increase as a result. When the voltage amplitude reaches a level approximately equal to the output voltage, the first surge protection diode Dsurge1 will be turned on, and the voltage applied to the bridgeless power factor correction circuit 100 will be clamped to the output voltage. As such, the surge protection diode Dsurge1 helps to prevent the surge from damaging the bridgeless power factor correction circuit 100. During this process, the bridgeless power factor correction circuit 100 may detect a power surge occurred in the first half cycle of the input ac source, and protect the bridgeless power factor correction circuit 100 by shutting down the first switch S1 and other appropriate components.

Furthermore, the energy from the voltage surge is discharged through a conductive path formed by the first surge protection diode Dsurge1, output capacitor Co, the load resistor Ro and the switch SR2. As a result, the conduction of the first surge protection diode Dsurge1 limits the voltage applied to the bridgeless power factor correction circuit 100 to a voltage level approximately equal to the output voltage plus a diode voltage drop. In accordance with an embodiment, by employing the first surge protection diode Dsurge1, the highest voltage the bridgeless power factor correction circuit 100 endures is around 400V.

Figure 8:
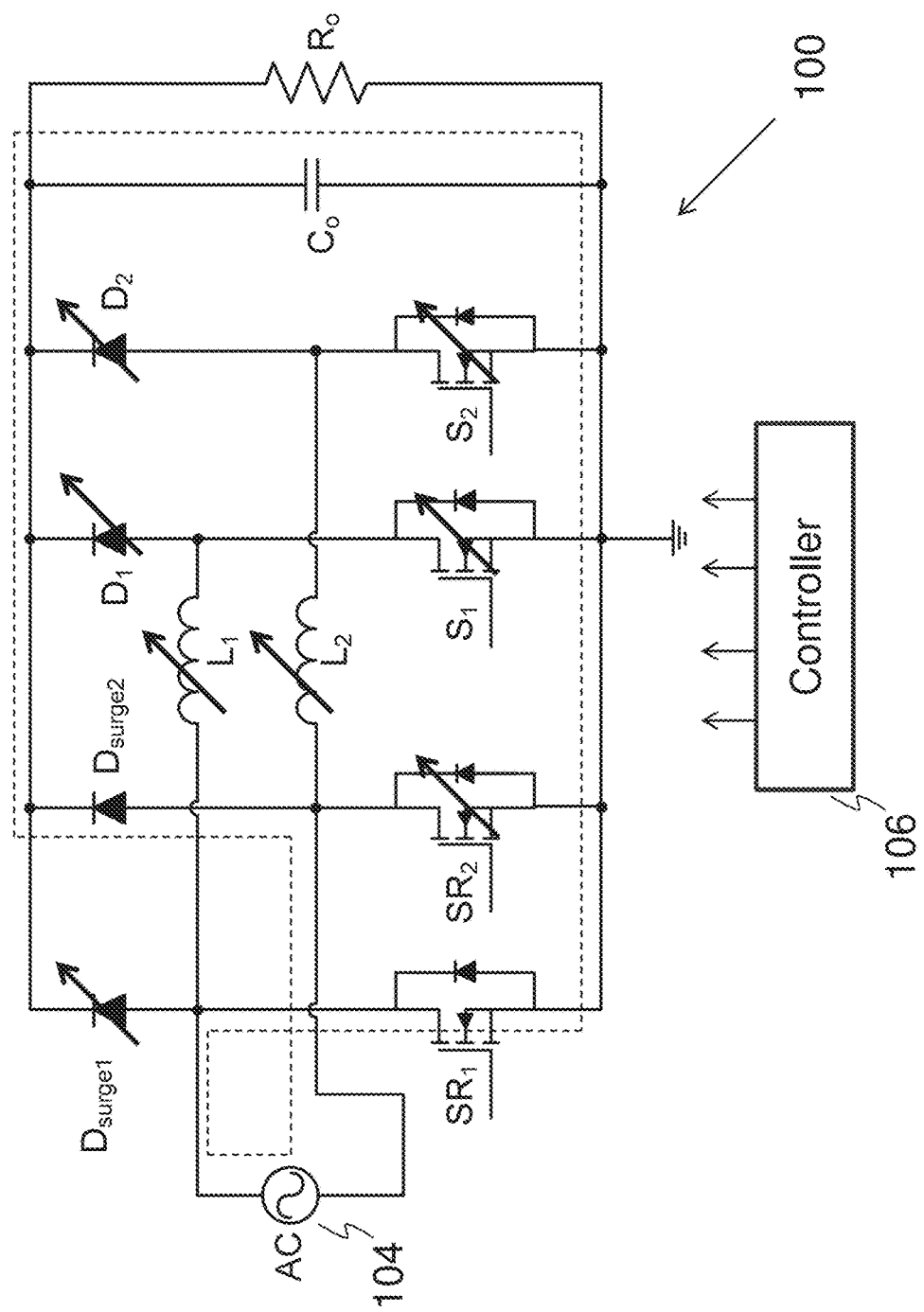
FIG. 8 illustrates a schematic diagram of a bridgeless power factor correction circuit operating in a second half cycle power surge mode in accordance with an embodiment.

Similarly, the second surge protection diode Dsurge2 can prevent the surge from damaging the bridgeless power factor correction circuit 100 in a second half cycle of the power surge. FIG. 8 illustrates a schematic diagram of a bridgeless power factor correction circuit operating in a second half cycle power surge mode in accordance with an embodiment. When a surge occurs during the second half cycle of the input ac source, the input voltage amplitude may increase as a result. When the input voltage amplitude reaches a level slightly higher than the output voltage, the second surge protection diode Dsurge2 will be turned on, and the surge voltage applied to the bridgeless power factor correction circuit 100 will be clamped to the output voltage. As such, the second surge protection diode Dsurge2 helps to prevent the surge from damaging the bridgeless power factor correction circuit 100. During this process, the bridgeless power factor correction circuit 100 may detect a power surge occurred in the second half cycle of the input ac source, and protect the bridgeless power factor correction circuit 100 by shutting down the second switch S2 and other appropriate components.

Furthermore, in the second cycle of the input ac source, the energy from the voltage surge is discharged through a conductive path formed by the second surge protection diode Dsurge2, the output capacitor Co, the load resistor Ro and the switch SR1. As a result, the conduction of the second surge protection diode Dsurge2 limits the voltage applied to the bridgeless power factor correction circuit 100 to a voltage level approximately equal to the output voltage plus a diode voltage drop. In accordance with an embodiment, by employing the second surge protection diode Dsurge2, the highest voltage the bridgeless power factor correction circuit 100 endures is around 400V. In sum, both surge protection diodes Dsurge1 and Dsurge2 provide an automatic protection mechanism for input voltage surges. Furthermore, the surge protection diodes (e.g., Dsurge1) and the switch (e.g., SR2) provide a surge energy discharge path so that the components of the bridgeless power factor correction circuit are protected accordingly.

Figure 9:
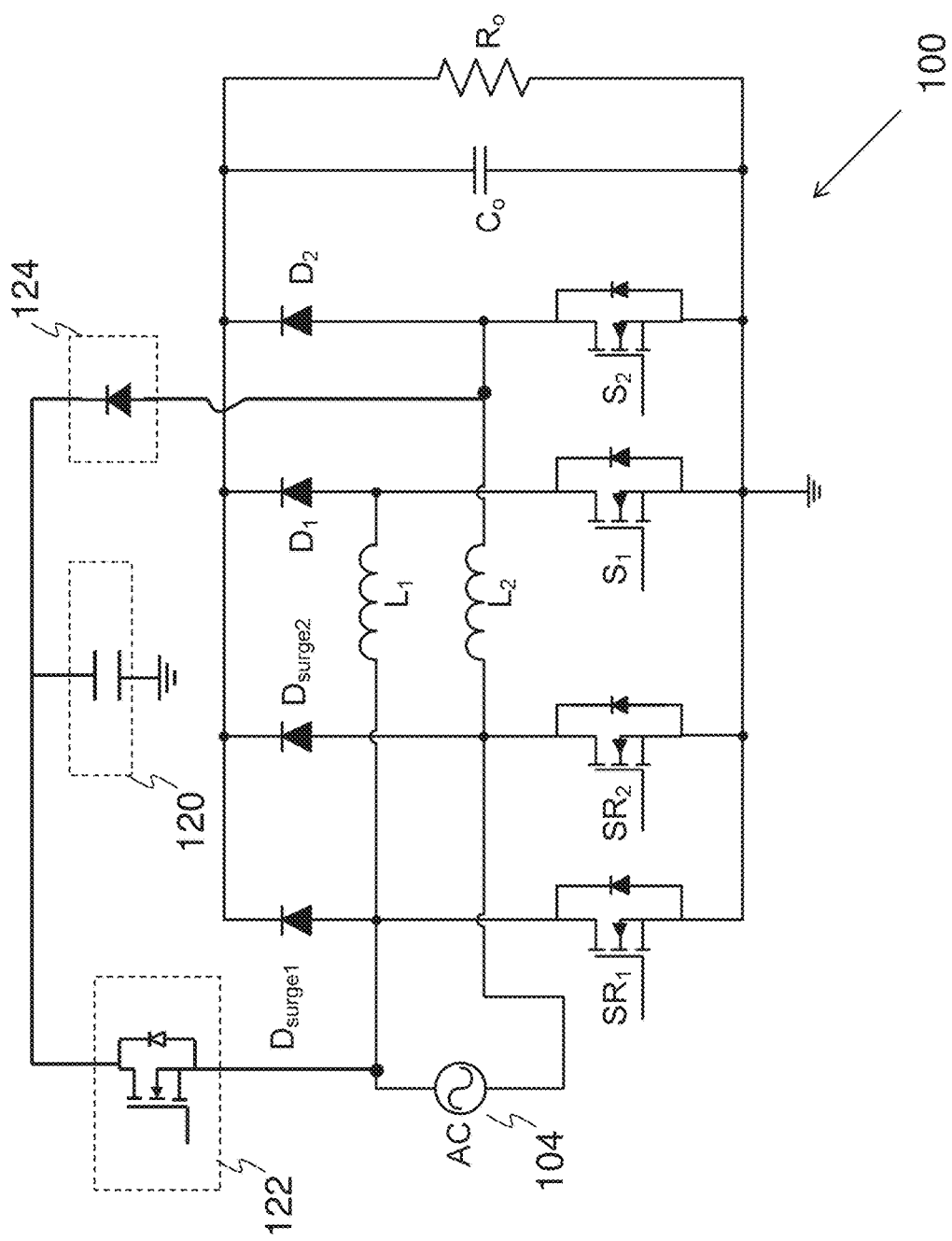
FIG. 9 illustrates a schematic diagram of a bridgeless power factor correction circuit having an energy storage apparatus in accordance with an embodiment.

FIG. 9 illustrates a schematic diagram of a bridgeless power factor correction circuit having an energy storage apparatus in accordance with an embodiment. The energy storage apparatus 120 is formed by a capacitor as shown in FIG. 9. It should be noted that while FIG. 9 shows a single capacitor, a person skilled in the art will recognize that it is within the scope and spirit of the invention for the energy storage apparatus 120 to comprise a plurality of capacitors connected in parallel. In order to charge the storage apparatus 120, a charge device 124 is employed to facilitate a channel through which the energy from the bridgeless power factor correction circuit 100 is used to charge the capacitor of the energy storage apparatus 120 during normal operation.

In accordance with an embodiment, the charge device 124 shown in FIG. 9 comprises a diode. In addition, the diode is coupled between one terminal of the second inductor L2 and the energy storage apparatus 120. It should be noted that one skilled in the art will recognize that the diode and its configuration are simply one manner of charging the energy storage apparatus 120 and that other and alternate embodiment connections could be employed (such as employing a diode coupled between the first inductor L1 and the energy storage apparatus 120) and that other circuits, (e.g., a switching element connected the output of the bridgeless power factor correction circuit 100 and the energy storage apparatus 120) could be employed for this function. The detailed operation of the charge device 124 will be described below with respect to FIG. 10.

In accordance with an embodiment, the discharge device 122 shown in FIG. 9 comprises an n-type metal oxide semiconductor (NMOS) transistor. In addition, the NMOS transistor is coupled between one terminal of the input ac source and the energy storage apparatus 120. It should be noted that one skilled in the art will recognize that the diode and its configuration are simply one manner of charging the energy storage apparatus 120 and that other and alternate embodiment circuits could be employed (such as employing two NMOS transistors coupled to the first inductor L1 and the second inductor L2 respectively) and that other configurations, (e.g., combining the NMOS transistor and a surge protection diode such as Dsurge1 into a single device) could be employed for this function. The detailed operation of the discharge device 122 will be described below with respect to FIG. 11

Figure 10:
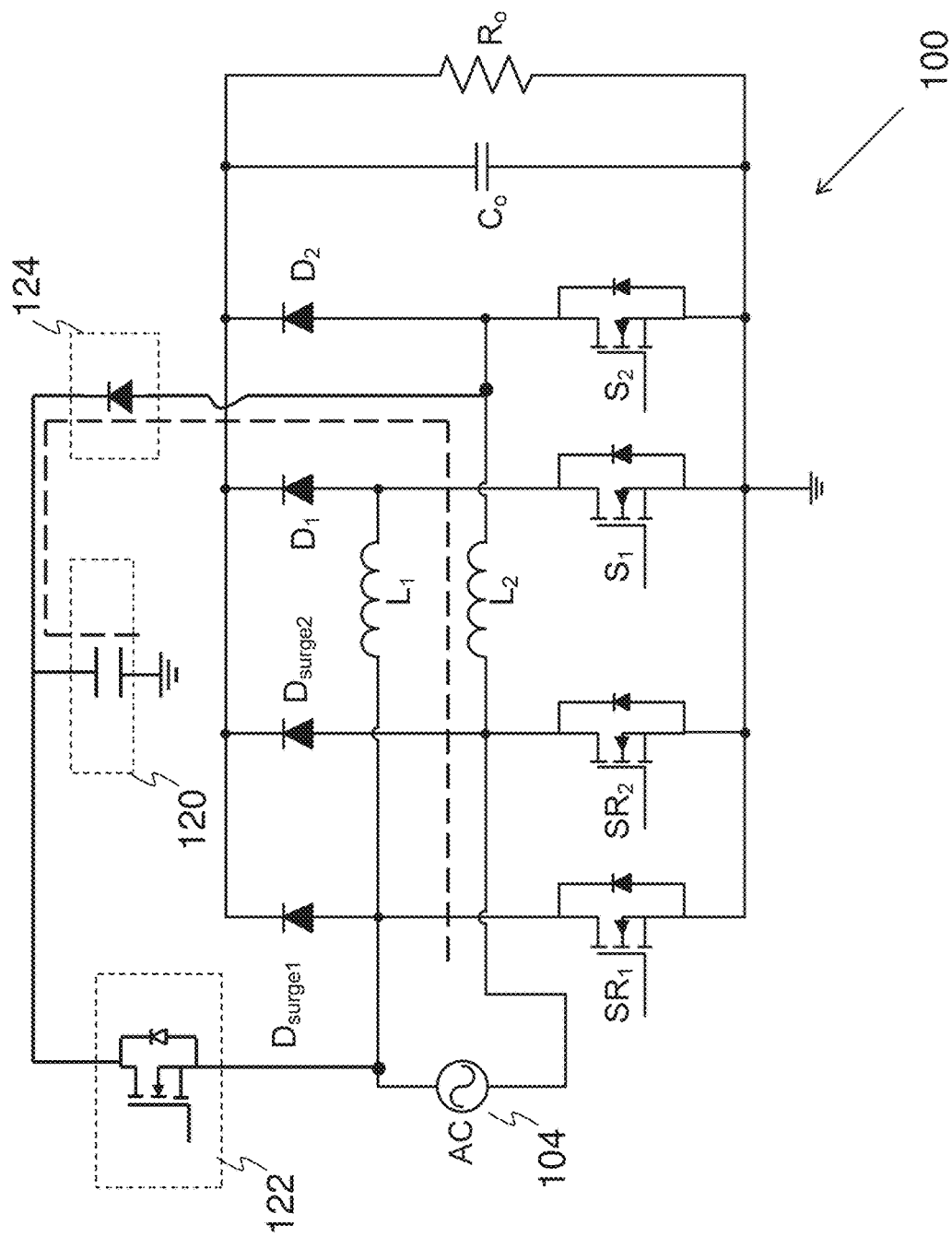
FIG. 10 illustrates a schematic diagram of a bridgeless power factor correction circuit having an energy storage apparatus operating in charge mode in accordance with an embodiment.

FIG. 10 illustrates a schematic diagram of a bridgeless power factor correction circuit having an energy storage apparatus operating in charge mode in accordance with an embodiment. A charge device 124 coupled to one terminal of the second inductor L2 is used to illustrate the charge process of the energy storage apparatus 120. As shown in FIG. 10, when the second half cycle of the input ac source is applied to the input of the bridgeless power factor correction circuit 100, the controller 106 (not shown but illustrated in FIG. 1) enables the second boost power converter. Because the charge device 124 has the same connection as the second diode D2, the second half cycle of the input ac source delivers energy to the output of the bridgeless power factor correction circuit 100 as well as the energy storage apparatus 120. As a result, the voltage across the energy storage apparatus 120 is charged up to a level approximately equal to the output voltage of the bridgeless power factor correction circuit 100.

The dashed line in FIG. 10 depicts the charge path formed by the second inductor L2, the charge device 124 and the energy storage apparatus 120. It should be noted that the charge mode of the energy storage apparatus 120 occurs in the diode conduction period of the second boost power converter. When the second boost converter operates in a switch conduction mode, the diode of the charge device 124 is reverse-biased. As such, the energy stored in the capacitor of the energy storage apparatus 120 remains the same during the period of the switch conduction mode. Furthermore, it should be noted that the controller 106 may turn off the switch of the discharge device 122 during the charge mode because the input ac source operates within its normal range.

Figure 11:
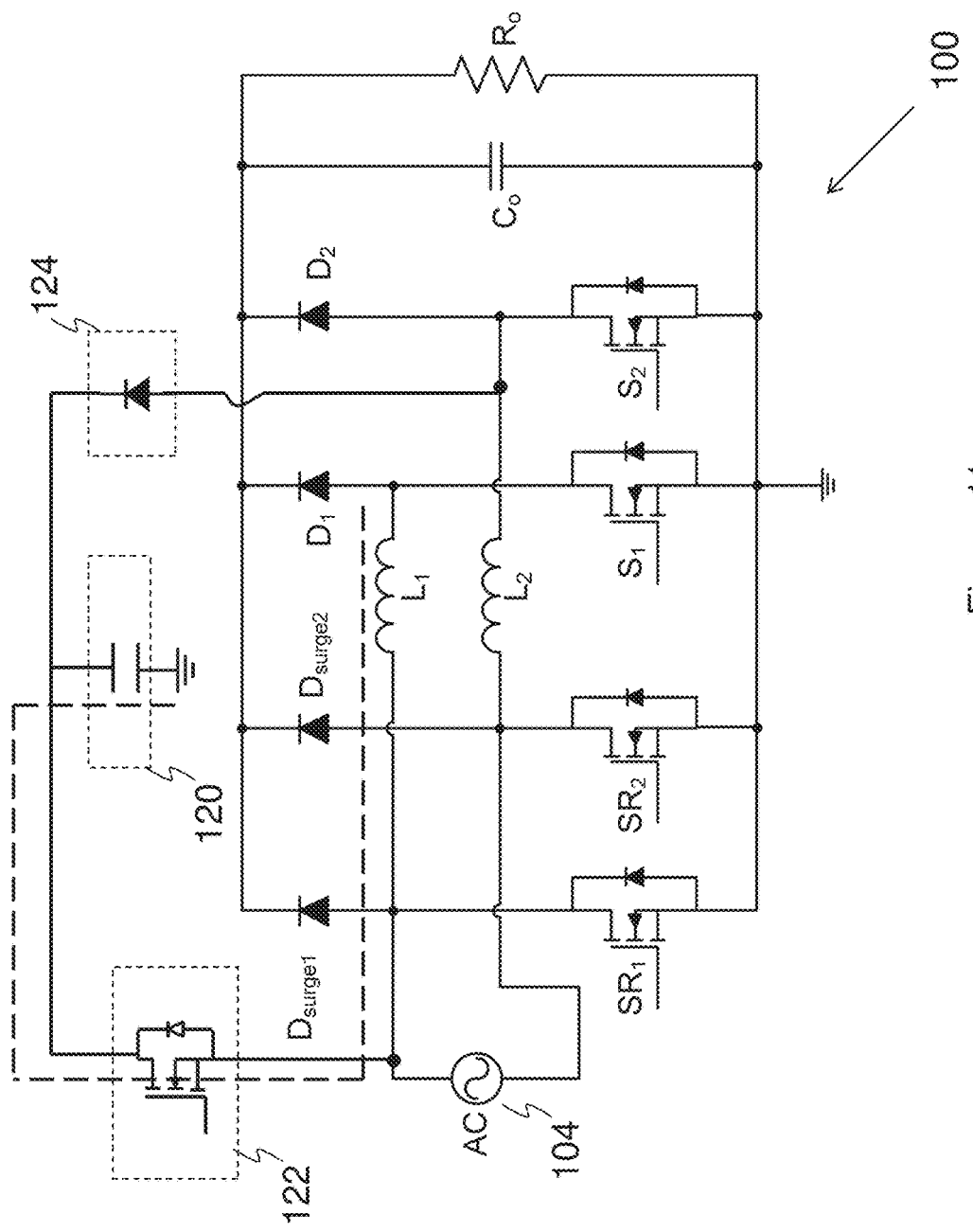
FIG. 11 illustrates a schematic diagram of a bridgeless power factor correction circuit having an energy storage apparatus operating in discharge mode in accordance with an embodiment.

FIG. 11 illustrates a schematic diagram of a bridgeless power factor correction circuit having an energy storage apparatus operating in discharge mode in accordance with an embodiment. A discharge device 122 coupled between one terminal of the input ac source and the energy storage apparatus 120 is used to illustrate the discharge process of the energy storage apparatus 120. As shown in FIG. 11, when the input ac source has a dropout, the controller 106 (not shown but illustrated in FIG. 1) may detect the dropout. Consequently, the controller 106 may disable the power factor correction mode of both the first boost converter and the second boost converter. In addition, the controller 106 activates the discharge device 122 so that the energy storage apparatus 120 may deliver energy through the turned on switch of the discharge device 122 to the first boost converter. The dashed line in FIG. 11 depicts the discharge path formed by the energy storage apparatus 120, the discharge device 122 and the first boost converter.

In response to the dropout of the input ac source, the first boost converter may convert the input voltage from the storage capacitor of the energy storage apparatus 120 into a voltage level equal to the output voltage of the bridgeless factor correction circuit 100 prior to the dropout of the input ac source. As such, the output capacitor Co of the bridgeless power factor correction circuit 100 may remain the same until the energy storage apparatus 120 is depleted or nearly depleted. An advantageous feature of having the energy storage apparatus 100 coupled to an input of the first boost converter during an input ac source dropout is that the output of the bridgeless power factor correction circuit 100 may be kept within a narrow arrange so that the efficiency of downstream converters can be improved.

Figure 12:
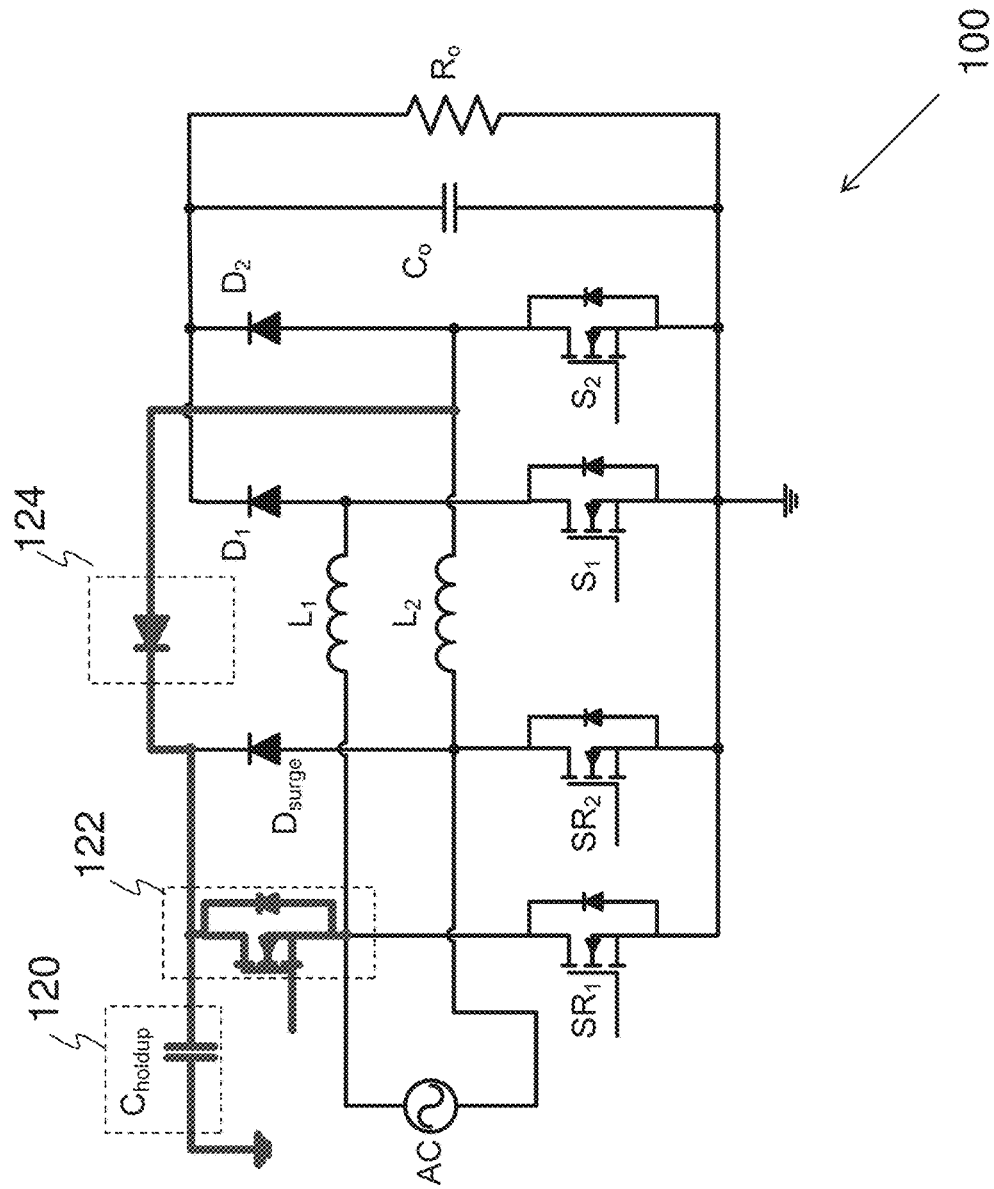
FIG. 12 illustrates a schematic diagram of a bridgeless power factor correction circuit having an energy storage apparatus in accordance with another embodiment.

FIG. 12 illustrates a schematic diagram of a bridgeless power factor correction circuit having an energy storage apparatus in accordance with another embodiment. FIG. 12 is similar to FIG. 9 except that the discharge device 122 and the first surge protection diode Dsurge1 are combined into one single device. More particularly, as shown in FIG. 12, the body diode of the NMOS transistor of the discharge device 122 can be used as a surge protection diode when an input line surge occurs. As a result, a surge protection diode can be saved. One person skilled in the art will recognize that while FIG. 12 shows that the discharge device 122 and the first surge protection diode Dsurge1 are combined into one single device, the discharge device 122 can also be used to replace the second surge protection diode Dsurge2. For example, by coupling the discharge device 122 between the energy storage apparatus 120 and the input of the second inductor L2, the second surge protection diode Dsurge2 can be removed as a result.

Figure 13:
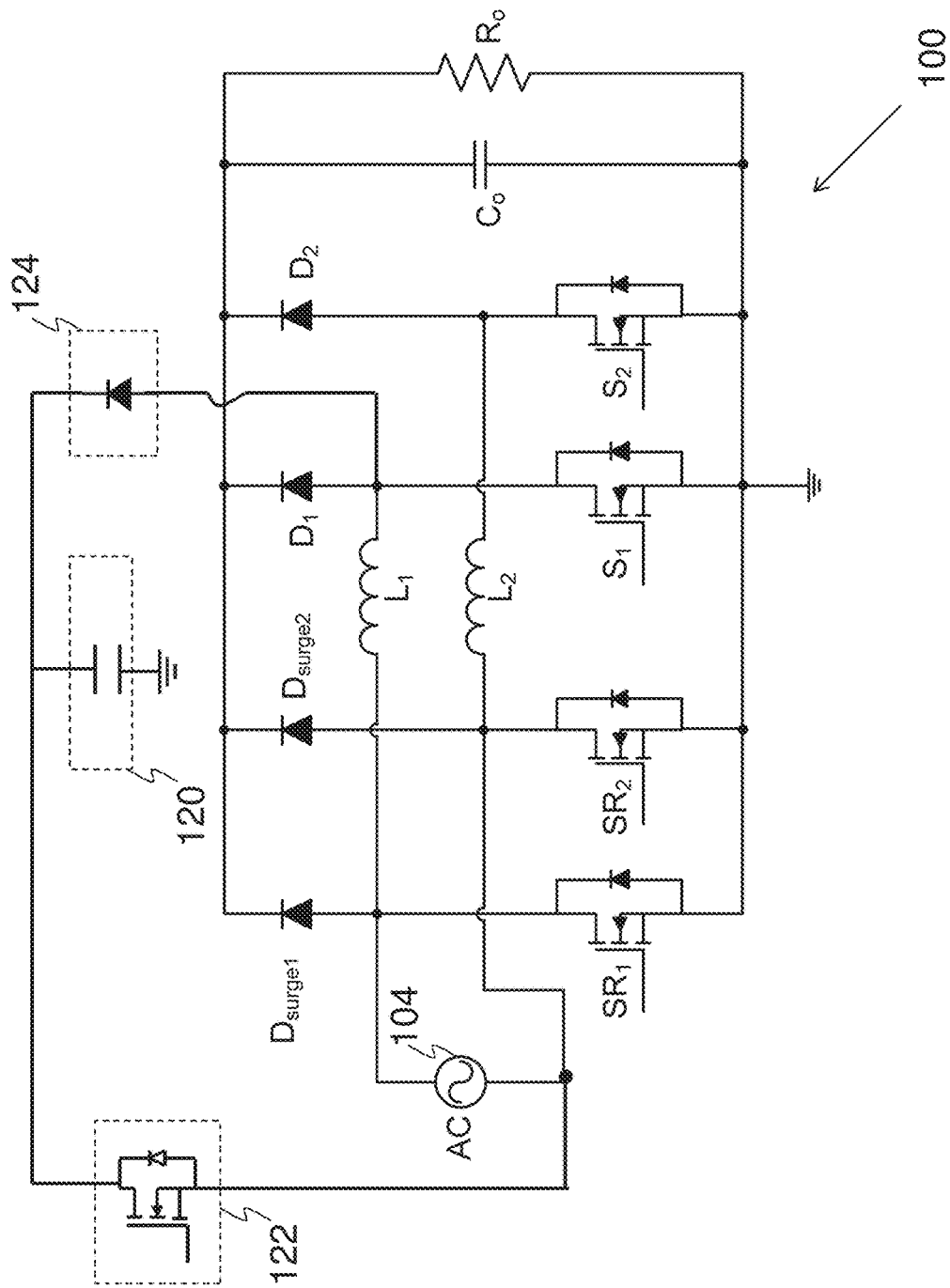
FIG. 13 illustrates a schematic diagram of a bridgeless power factor correction circuit having an energy storage apparatus in accordance with yet another embodiment.

FIG. 13 illustrates a schematic diagram of a bridgeless power factor correction circuit having an energy storage apparatus in accordance with yet another embodiment. FIG. 13 is similar to FIG. 9 except that the charge device 124 is coupled to one terminal of the first inductor L1 rather than one terminal of the second inductor L2. Because the first boost converter and the second boost converter work in tandem, the operation principle of the charge device 124 shown in FIG. 13 is similar to that shown in FIG. 9. As shown in FIG. 13, during normal operation, the bridgeless power factor correction circuit 100 charges the energy storage apparatus 120 through the charge device 124 during the first half cycle of the input ac source. In contrast, in FIG.

9, the bridgeless power factor correction circuit 100 charges the energy storage apparatus 120 during the second half cycle of the input ac source.

It should be noted that in FIG. 13, in response to the change of the connection of the charge device 124 from the second boost converter to the first boost converter, the connection of the discharge device 122 is modified as well in comparison with that of FIG. 9. As shown in FIG. 13, the discharge device 122 is coupled between the energy storage apparatus 120 and the input of the second boost converter. The discharge process of FIG. 13 is similar to that described with respect to FIG. 11, and hence is not discussed in further detail to avoid unnecessary repetition.

Figure 14:
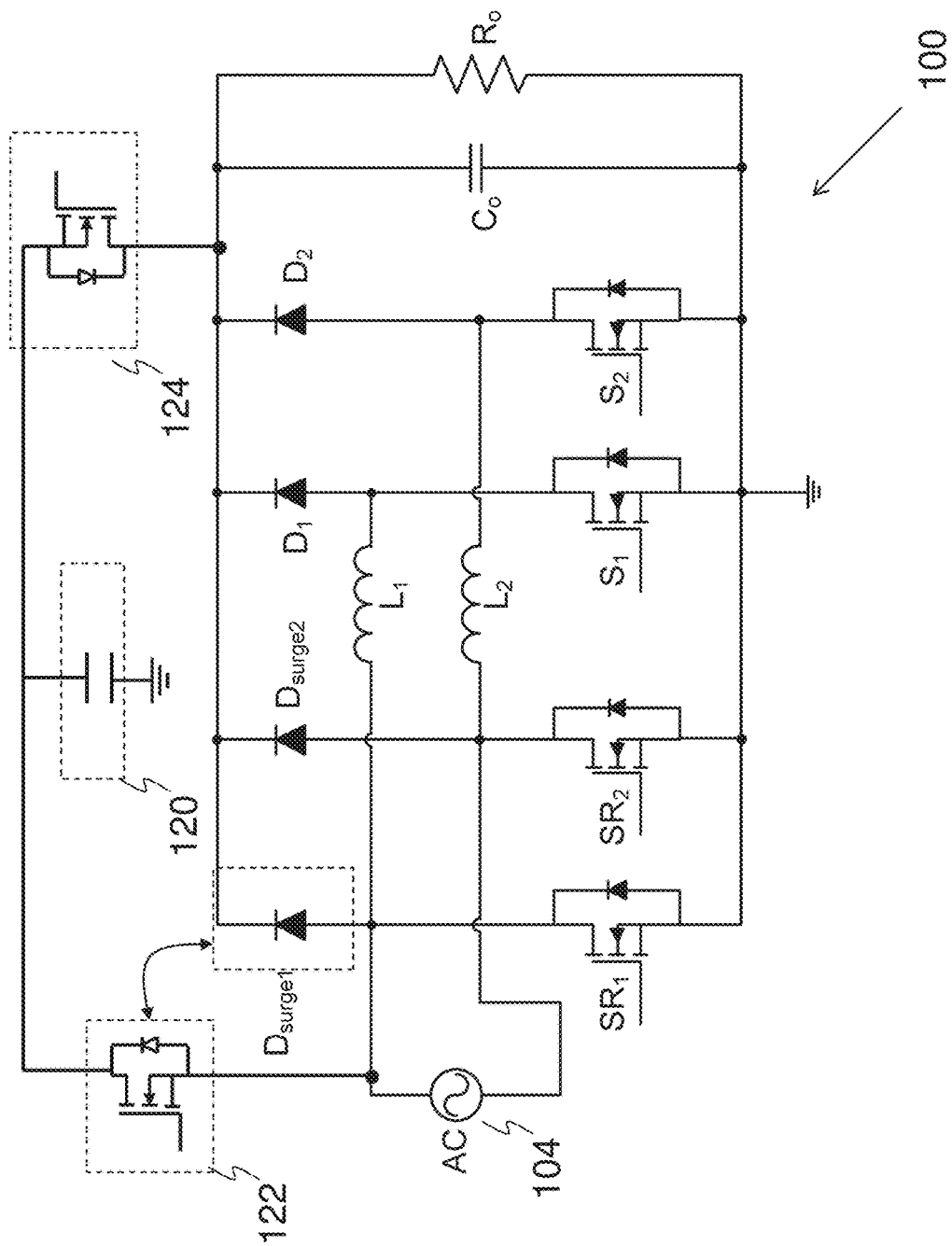
FIG. 14 illustrates an alternative for implementing the charge and discharge devices in accordance with an embodiment.

FIG. 14 illustrates an alternative for implementing the charge and discharge devices in accordance with an embodiment. As shown in FIG. 14, the charge device 124 may comprise a NMOS transistor. The NMOS transistor has a source coupled to the energy storage apparatus 120, a drain coupled to the output of the bridgeless power factor correction circuit 100 and a gate coupled to the controller 106 (not shown). During normal operation, the NMOS transistor in the charge device is turned on so that the output of the bridgeless power factor correction circuit 100 can charge the energy storage apparatus 120 up to a level approximately equal to the output voltage.

When a dropout of the input ac source occurs, the controller 106 turns off the charge device 124 and turns on the discharge device 122. In FIG. 14, the discharge device 122 is coupled to the input of the first boost converter. A person skilled in the art will recognize that the discharge device 122 can be coupled to the input of the second boost converter when the charge device 124 is a switching element coupled to the output of the bridgeless power factor correction circuit 100. The operation of the discharge device 122 has been described in detail with respect to FIG. 11, and hence is not discussed again to avoid repetition.

It should be noted that while FIG. 14 shows an NMOS transistor in the charge device 124 and the discharge device 122, a person skilled in the art will recognize that the NMOS transistor and its configuration are simply one manner of charging or discharging the energy storage apparatus 120 and that other and alternate embodiment components could be employed (such as employing a p-type metal oxide semiconductor (PMOS) transistor and the like) and that other circuits, (e.g., a plurality of NMOS transistors connected in parallel) could be employed for this function.

It should further be noted that the discharge device 122 can be combined with the first surge protection diode Dsurge1 as indicated by the double headed arrow shown in FIG. 14. A person skilled in the art will recognize that the body diode of the NMOS transistor of the discharge device 122 can be used as a surge protection diode. As such, the dedicated surge protection diode Dsurge1 can be removed. As a result, the voltage surge of the input ac source can be clamped to the voltage of the energy storage apparatus 120, which is approximately equal to the output voltage of the bridgeless power factor correction circuit 100.

Figure 15:
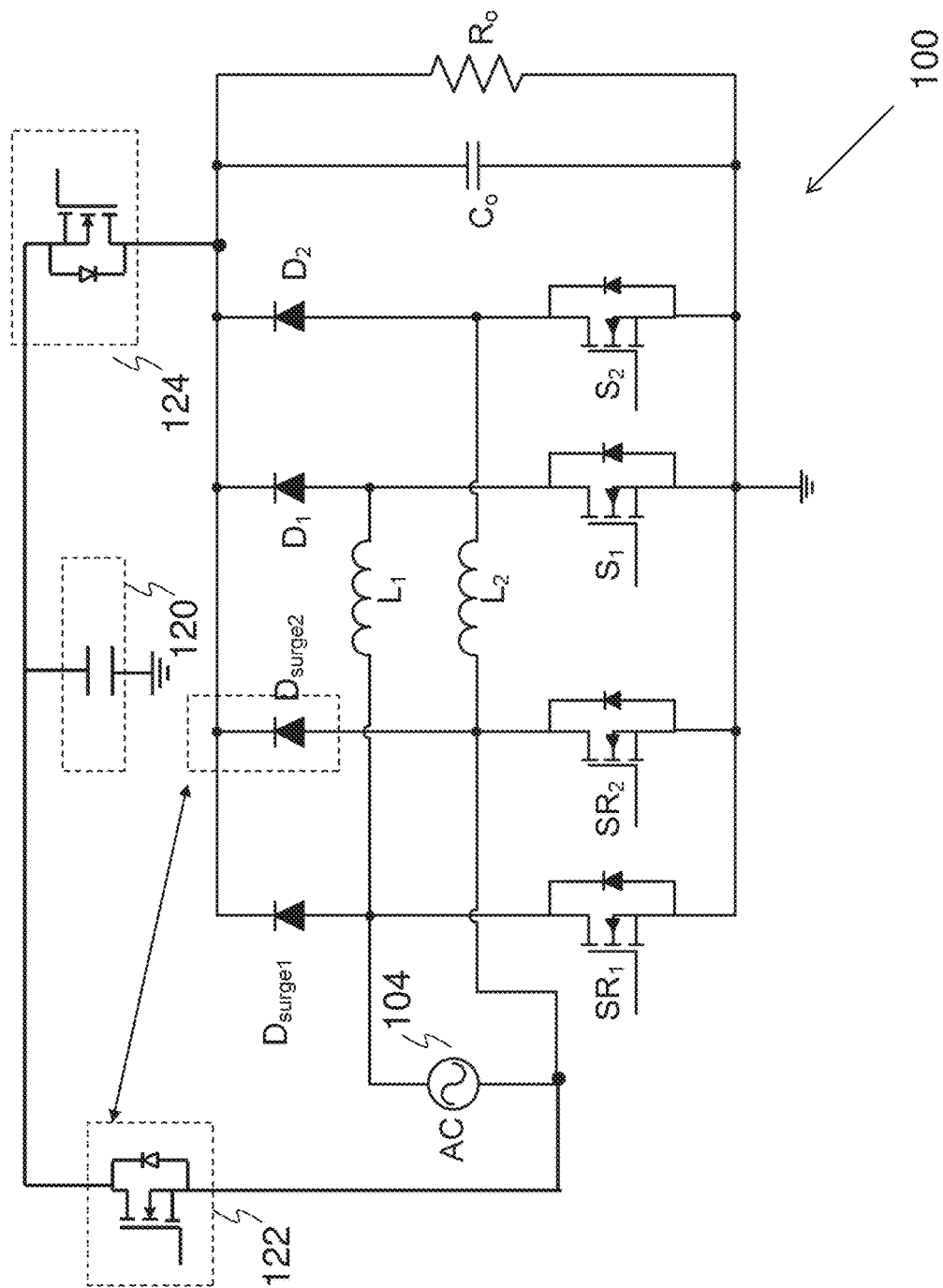
FIG. 15 illustrates another alternative for implementing the charge and discharge devices in accordance with an embodiment.

FIG. 15 illustrates another alternative for implementing the charge and discharge devices in accordance with an embodiment. FIG. 15 is similar to FIG. 14 except that the discharge device 122 is coupled to the input of the second boost converter rather than the input of the first boost converter. During a dropout of the input ac source, the energy storage apparatus 120 discharges through the second boost converter so that the output of the bridgeless power factor correction circuit 100 remains the same. Similar to FIG. 14, the discharge device 122 can be combined with the second surge protection diode Dsurge2. As such, the dedicated surge protection diode Dsurge2 can be removed. As a result, the voltage surge of the input ac source can be clamped to the voltage of the energy storage apparatus 120, which is approximately equal to the output voltage of the bridgeless power factor correction circuit 100.

Figure 16:
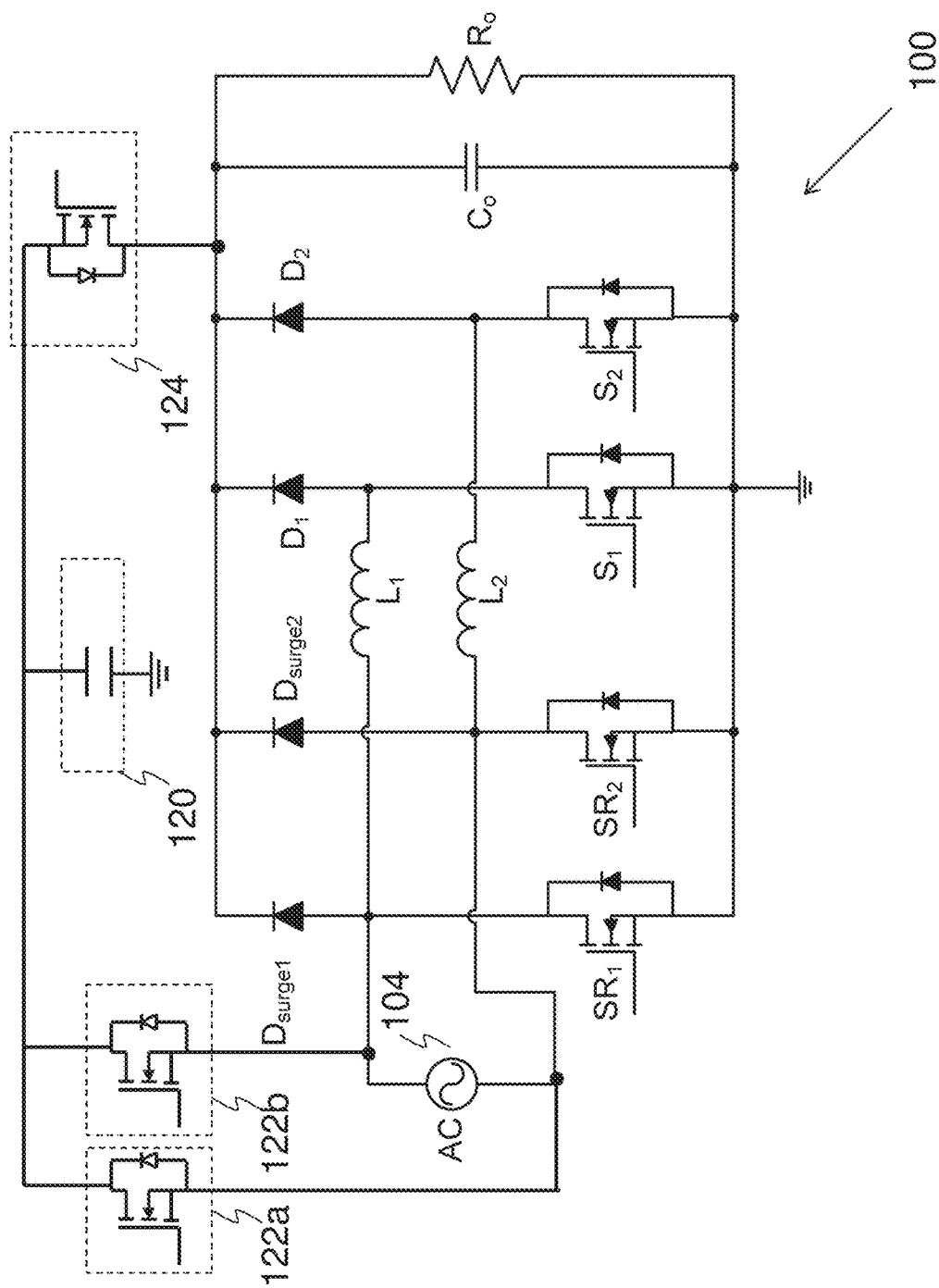
FIG. 16 illustrates another alternative for implementing the charge and discharge devices in accordance with an embodiment.

FIG. 16 illustrates another alternative for implementing the charge and discharge devices in accordance with an embodiment. FIG. 16 is similar to FIG. 14 and FIG. 15 except that the discharge device 122 shown in FIG. 16 is a combination of the discharge devices shown in FIG. 14 and FIG. 15. As shown in FIG. 16, during a dropout of the input ac source, both the first boost converter and the second boost converter are used to maintain the output voltage of the bridgeless power factor correction circuit 100. The operation of two boost converters operating in parallel is within the scope of a person skilled in art, and hence is not discussed in further detail.

Figure 17:
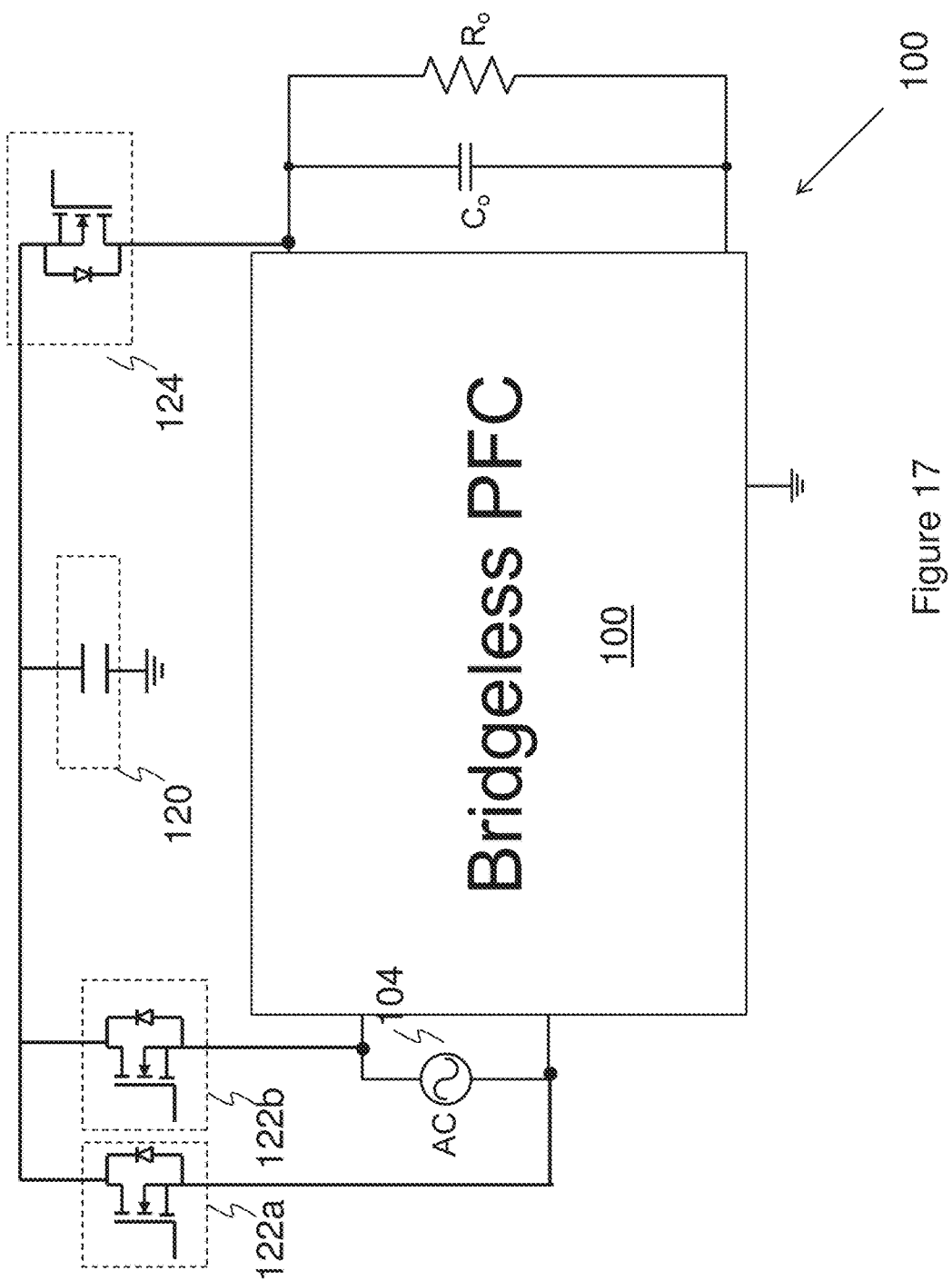
FIG. 17 illustrates yet another alternative for implementing the charge and discharge devices in accordance with an embodiment.

FIG. 17 illustrates yet another alternative for implementing the charge and discharge devices in accordance with an embodiment. FIG. 17 is similar to FIG. 16 except that the surge protection diodes Dsurge1 and Dsurge2 (illustrated in FIG. 16) are removed as a result of adding the discharge devices 122a and 122b. More particularly, the body diode of the discharge device 122a can replace the second surge protection diode Dsurge2 (illustrated in FIG. 16). Likewise, the body diode of the discharge device 122b can replace the first surge protection diode Dsurge1 (illustrated in FIG. 16). An advantageous feature of having two discharge devices (e.g., discharge devices 122a and 122b) is that the body diodes of the discharge devices can be used as surge protection devices so that the cost of surge protection diodes (e.g., surge protection diodes Dsurge1 and Dsurge2) can be saved.

Figure 18:
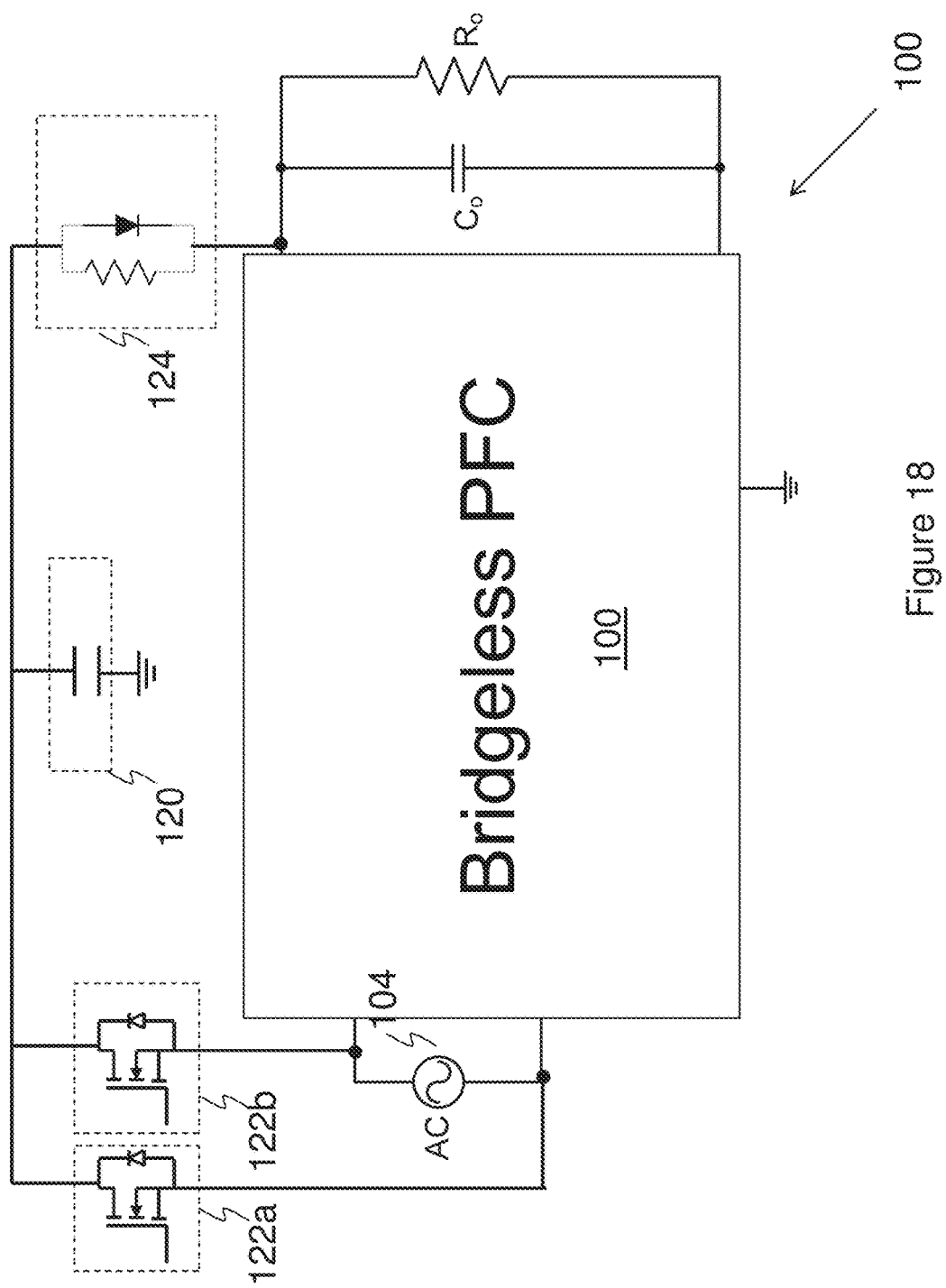
FIG. 18 illustrates yet another alternative for implementing the charge and discharge devices in accordance with an embodiment.

FIG. 18 illustrates yet another alternative for implementing the charge and discharge devices in accordance with an embodiment. FIG. 18 is similar to FIG. 17 except that the NMOS transistor of the charge device 124 can be replaced by a resistor and a diode connected in parallel. In particular, the output of the bridgeless power factor correction circuit 100 charges the energy storage apparatus 120 through the resistor shown in FIG. 18. The diode connected in parallel with the resistor provides a protection for the energy storage apparatus 120. In other words, the voltage of the energy storage apparatus 120 can be clamped to a voltage approximately equal to the voltage of the output of the bridgeless power factor correction circuit 100.

Figure 19:
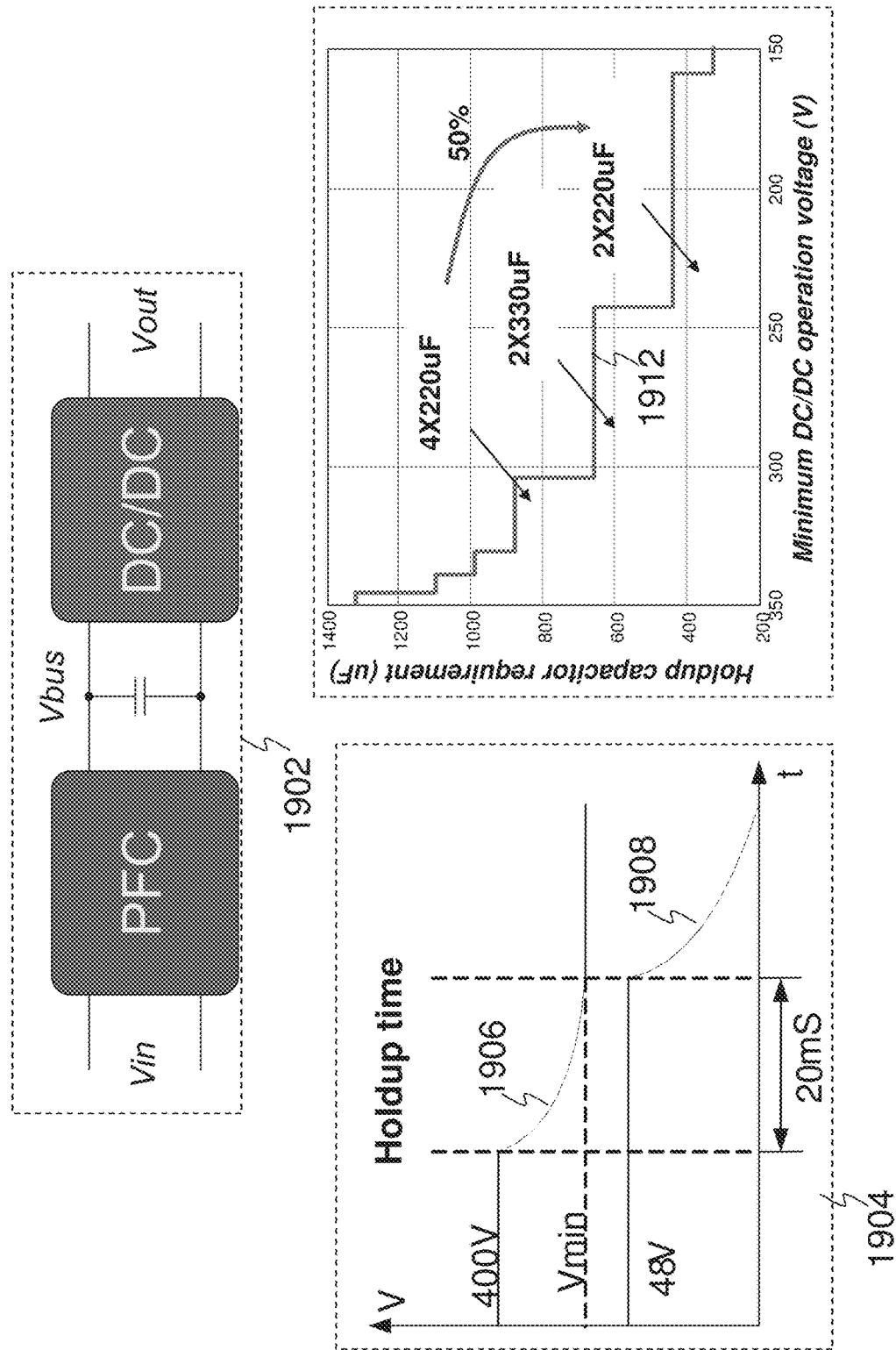
FIG. 19 illustrates a comparison between two holdup time extension mechanisms.

FIG. 19 illustrates a comparison between two holdup time extension mechanisms. A power system 1902 comprises a power factor correction circuit and an isolated dc/dc converter. As shown in FIG. 19, the power factor correction circuit and the isolated dc/dc converter are connected in cascade. In accordance with an embodiment, the output of the power factor correction circuit is about 400V. The holdup time of the power system 1902 is illustrated in a holdup time FIG. 1904. As indicated by a curve 1906, the holdup time of the power system 1902 is the discharge time of the output of the power factor correction circuit from 400V to the minimum operating voltage of the isolated dc/dc converter when an input line dropout occurs. In accordance with an embodiment, the holdup time is about 20 ms.

In order to meet the holdup time requirement (e.g., 20 ms), two holdup time extension mechanisms may be employed. A first holdup time extension mechanism is based upon increasing the capacitance of the output of power factor correction circuit. On the other hand, a second holdup time extension mechanism is based upon increasing the input operating range of the isolated dc/dc converter. A curve 1912 illustrates a comparison between these two mechanisms. In accordance with an embodiment, by changing the minimum operating voltage of the isolated dc/dc converter from 325V to 225V, the output capacitance of the power factor correction circuit can be reduced by 50%.

Figure 20:
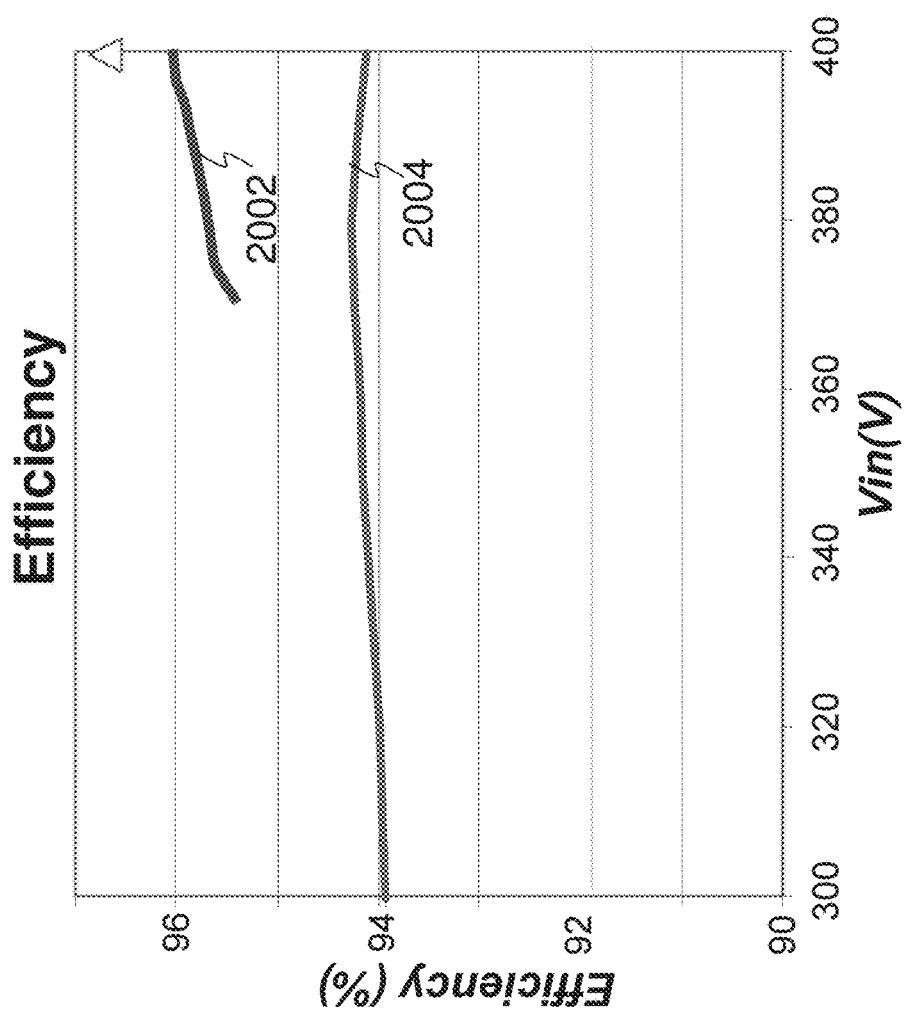
FIG. 20 illustrates an efficiency comparison between a power system employing a wide input operating voltage range for an isolated dc/dc converter and the power system employing a narrow input operating voltage range for the isolated dc/dc converter.

FIG. 20 illustrates an efficiency comparison between a power system employing a wide input operating voltage range for an isolated dc/dc converter and the power system employing a narrow input operating voltage range for the isolated dc/dc converter. In accordance with an embodiment, when a narrow input operating voltage range (e.g., from 375V to 400V as shown in FIG. 20) is employed, a curve 2002 shows the efficiency of the isolated dc/dc converter at a normal input voltage 400 V is up to 96%. In contrast, when a wide input operating voltage range (e.g., from 300V to 400V) is employed, a curve 2004 shows the efficiency of the isolated dc/dc converter at a normal input voltage 400 V is about 94%.

As described above with respect to FIGS. 9-16, the proposed holdup time circuit can extend the holdup time for a bridgeless power factor correction circuit. At the same time, the proposed holdup time circuit can maintain the input voltage of the isolated dc/dc converter within a narrow range because the holdup time circuit is not directly coupled to the output of the bridgeless power factor correction circuit. Instead, the holdup time circuit is coupled to the output of the bridgeless power factor correction circuit through a boost converter. Such a boost converter helps to maintain the output of the bridgeless power factor correction circuit within a narrow range when the input line dropout occurs. In sum, the holdup time circuit can improve the efficiency of the isolated dc/dc converter.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A circuit comprising:
a charge device connected between an output terminal of a bridgeless power factor correction circuit and an energy storage apparatus; and
a discharge device connected between the energy storage apparatus and an input of the bridgeless power factor correction circuit, wherein the discharge device comprises a switching element, and wherein:
the bridgeless power factor correction circuit comprises a first boost converter, a second boost converter and an output of the first boost converter is connected to an output of the second boost converter.

2. The circuit of claim 1, wherein:
the charge device is an n-type metal oxide semiconductor transistor.

3. The circuit of claim 1, wherein:
the charge device is a diode.

4. The circuit of claim 1, wherein:
the charge device is a resistor and a diode connected in parallel.

5. The circuit of claim 1, wherein:
the discharge device is an n-type metal oxide semiconductor transistor.

6. The circuit of claim 1, further comprising:
a surge protection diode, wherein the discharge device and the surge protection diode are in one single device.

7. The circuit of claim 1, wherein:
the discharge device is formed by two n-type metal oxide semiconductor transistors.

8. The circuit of claim 7, wherein:
a first transistor of the discharge device is connected to an input terminal of the first boost converter; and
a second transistor of the discharge device is connected to an input terminal of the second boost converter.

9. The circuit of claim 8, wherein:
a body diode of the first transistor is configured to operate as a surge protection diode for the first boost converter; and
a body diode of the second transistor is configured to operate as a surge protection diode for the second boost converter.

10. A system comprising:
a bridgeless power factor correction circuit comprising a first boost converter coupled between a first terminal of an input ac source and an output, a second boost converter coupled between a second terminal of the input ac source and the output, a first switch coupled between an input of the first boost converter and ground and a second switch coupled between an input of the second boost converter and ground;
a plurality of surge protection diodes connected between the input ac source and the output;
a charge device connected between an output terminal of the bridgeless power factor correction circuit and an energy storage apparatus; and
a discharge device connected between the energy storage apparatus and an input of the bridgeless power factor correction circuit.

11. The system of claim 10, wherein the plurality of surge protection diodes comprises:
a first surge protection diode coupled between the input of the first boost converter and the output; and
a second surge protection diode coupled between the input of the second boost converter and the output.

12. The system of claim 10, wherein:
the charge device is a diode coupled between a first inductor of the first boost converter and the energy storage apparatus; and
the discharge device is a switching element coupled between the energy storage apparatus and the input of the second boost converter.

13. The system of claim 10, wherein:
the charge device is a diode coupled between a second inductor of the second boost converter and the energy storage apparatus; and
the discharge device is a switching element coupled between the energy storage apparatus and the input of the first boost converter.

14. The system of claim 10, wherein:
the charge device is a first switching element coupled between the output terminal of the bridgeless power factor correction circuit and the energy storage apparatus; and
the discharge device is a second switching element coupled between the energy storage apparatus and the input of the bridgeless power factor correction circuit.

15. The system of claim 10, wherein:
the charge device is a first switching element coupled between the output terminal of the bridgeless power factor correction circuit and the energy storage apparatus; and
the discharge device is formed by a second switching element and a third switching element connected to the first terminal and the second terminal of the input ac source, respectively.

16. A method comprising:
charging an energy storage apparatus through a charge device, wherein the charge device is connected between an output of a bridgeless power factor correction circuit and the energy storage apparatus; and
discharging the energy storage apparatus through a discharge device, wherein the discharge device is connected between the energy storage apparatus and an input of the bridgeless power factor correction circuit, wherein the discharge device comprises a switching element.

17. The method of claim 16, further comprising:
detecting a first half cycle of an input ac source connected to the bridgeless power factor correction circuit comprising two boost converters;
activating a first boost converter and a second switch coupled between an input of a second boost converter and ground; and
charging the energy storage apparatus from the first boost converter through the charge device.

18. The method of claim 16, further comprising:
detecting a second half cycle of an input ac source connected to the bridgeless power factor correction circuit comprising two boost converters;
activating a second boost converter and a first switch coupled between an input of a first boost converter and ground; and
charging the energy storage apparatus from the second boost converter through the charge device.

19. The method of claim 16, further comprising:
detecting, by a controller, a dropout of an input ac source connected to the bridgeless power factor correction circuit; and
activating the discharge device in response to the dropout.

20. The method of claim 19, wherein:
the controller is configured to control the charge device, the discharge device and the bridgeless power factor correction circuit.

* * * * *